(12) United States Patent
Williams et al.

(10) Patent No.: US 11,475,112 B1
(45) Date of Patent: Oct. 18, 2022

(54) VIRTUAL COMMUNICATIONS IDENTIFICATION SYSTEM WITH INTEGRAL ARCHIVING PROTOCOL

(71) Applicant: Verint Americas Inc., Alpharetta, GA (US)

(72) Inventors: Jamie Richard Williams, Fleet (GB); Marc Calahan, Milton, GA (US); Robert Barnes, Watford (GB); Murali Mohan Reddy Nareddy, Alpharetta, GA (US)

(73) Assignee: Verint Americas Inc., Alpharetta, GA (US)

( * ) Notice: Subject to any disclaimer, the term of this patent is extended or adjusted under 35 U.S.C. 154(b) by 472 days.

(21) Appl. No.: 15/702,510

(22) Filed: Sep. 12, 2017

Related U.S. Application Data

(60) Provisional application No. 62/393,605, filed on Sep. 12, 2016, provisional application No. 62/393,601, (Continued)

(51) Int. Cl.
*G06F 16/41* (2019.01)
*G06V 40/16* (2022.01)
*H04M 3/51* (2006.01)
*G06F 21/32* (2013.01)
*G06F 16/61* (2019.01)
(Continued)

(52) U.S. Cl.
CPC .............. *G06F 21/32* (2013.01); *G06F 16/41* (2019.01); *G06V 40/168* (2022.01); *G06V 40/172* (2022.01); *H04M 3/51* (2013.01); *H04M 3/5175* (2013.01); *H04M 3/5183* (2013.01); *H04M 3/5191* (2013.01); *G06F 16/61* (2019.01); *G06F 16/71* (2019.01); *H04M 3/50* (2013.01)

(58) Field of Classification Search
CPC ............. H04M 3/5175; H04M 3/5183; H04M 3/5191; H04M 3/50; H04M 3/51; G06K 9/00268; G06K 9/00288; G06F 21/32; G06F 16/41; G06F 16/61; G06F 16/71
See application file for complete search history.

(56) References Cited

U.S. PATENT DOCUMENTS 6,959,078 B1 * 10/2005 Eilbacher ................ H04M 3/51
379/265.09
8,271,618 B1 * 9/2012 Kridlo ..................... H04L 67/42
709/219

(Continued)

*Primary Examiner* — Daniel B Potratz
*Assistant Examiner* — D'Arcy Winston Straub
(74) *Attorney, Agent, or Firm* — Meunier Carlin & Curfman LLC

(57) ABSTRACT

A system for data recording across a network includes a session border controller connecting incoming data from the network to an endpoint recorder. A load balancer is connected to the network between the session border controller and the endpoint and receives the incoming data from the session border controller, wherein the load balancer comprises computer memory and a processor configured to parse the incoming data into video data and audio data according to identification protocols accessible by the processor from the computer memory. A recording apparatus includes recording memory that receives the incoming data from the load balancer, stores a duplicate version of the incoming data in the recording memory, and connects the incoming data to the endpoint.

19 Claims, 17 Drawing Sheets

Related U.S. Application Data filed on Sep. 12, 2016, provisional application No. 62/393,607, filed on Sep. 12, 2016.

(51) Int. Cl.
*G06F 16/71* (2019.01)
*H04M 3/50* (2006.01)

(56) References Cited

U.S. PATENT DOCUMENTS

| | | | |
|---|---|---|---|
| 8,401,155 B1 | 3/2013 | Barnes et al. | |
| 8,437,465 B1 | 5/2013 | Williams et al. | |
| 8,797,870 B2 | 8/2014 | Shankar et al. | |
| 8,886,580 B2 | 11/2014 | Grenier et al. | |
| 9,054,911 B1 | 6/2015 | Glover et al. | |
| 9,554,134 B2* | 1/2017 | Sermadevi | H04N 19/51 |
| 9,648,171 B1* | 5/2017 | Eftekhari | H04M 3/5232 |
| 10,051,122 B2* | 8/2018 | Raanani | G10L 17/02 |
| 2003/0147522 A1 | 8/2003 | Elazar | |
| 2006/0089980 A1 | 4/2006 | Nomura | |
| 2007/0263788 A1 | 11/2007 | Spohrer et al. | |
| 2009/0034436 A1 | 2/2009 | Brodhagen et al. | |
| 2010/0118865 A1 | 5/2010 | Jung et al. | |
| 2011/0197224 A1 | 8/2011 | Meijer | |
| 2012/0030682 A1 | 2/2012 | Shaffer et al. | |
| 2012/0066175 A1* | 3/2012 | Pickering | G06F 16/31 |
| | | | 707/E17.044 |
| 2013/0054806 A1 | 2/2013 | Francis et al. | |
| 2013/0142332 A1 | 6/2013 | Ramos et al. | |
| 2014/0079207 A1* | 3/2014 | Zhakov | H04M 3/5233 |
| | | | 379/265.03 |
| 2014/0162680 A1 | 6/2014 | Kotecha et al. | |
| 2014/0250227 A1* | 9/2014 | Slovacek | H04L 43/10 |
| | | | 709/224 |
| 2015/0077550 A1* | 3/2015 | Apelbaum | G06K 9/6289 |
| | | | 348/143 |
| 2015/0131792 A1 | 5/2015 | Kuhn et al. | |
| 2015/0281436 A1 | 10/2015 | Kumar et al. | |
| 2015/0281445 A1* | 10/2015 | Kumar | H04M 3/5175 |
| | | | 379/88.01 |
| 2015/0378561 A1 | 12/2015 | Ollinger et al. | |
| 2015/0378577 A1 | 12/2015 | Lum et al. | |
| 2016/0020909 A1 | 1/2016 | Gardeñes Liñan | |
| 2016/0036973 A1 | 2/2016 | Harasimiuk et al. | |
| 2016/0133274 A1* | 5/2016 | Conway | H04M 3/2281 |
| | | | 704/257 |
| 2016/0269422 A1 | 9/2016 | McDougal | |
| 2017/0171286 A1 | 6/2017 | Coste et al. | |
| 2017/0323344 A1* | 11/2017 | Nigul | G06Q 30/0269 |
| 2017/0353605 A1* | 12/2017 | Dumaine | G06K 9/6267 |

* cited by examiner

VIRTUAL COMMUNICATIONS IDENTIFICATION SYSTEM WITH INTEGRAL ARCHIVING PROTOCOL

CROSS REFERENCE TO RELATED APPLICATIONS

This application claims priority to and incorporates entirely by reference U.S. Provisional Patent Application Ser. No. 62/393,601, filed on Sep. 12, 2016, and entitled "SYSTEM AND METHOD FOR PARSING AND ARCHIVING MULTIMEDIA DATA."

This application claims priority to and incorporates entirely by reference U.S. Provisional Patent Application Ser. No. 62/393,605 filed on Sep. 12, 2016, and entitled "VIRTUAL COMMUNICATIONS IDENTIFICATION SYSTEM WITH INTEGRAL ARCHIVING PROTOCOL."

This application claims priority to and incorporates entirely by reference U.S. Provisional Patent Application Ser. No. 62/393,607 filed on Sep. 12, 2016, and entitled "VIRTUAL COMMUNICATIONS ASSESSMENT IN A MULTIMEDIA ENVIRONMENT."

BACKGROUND

A traditional passive tap recording technique includes recorders that are deployed along routes of communications. In this technique, each recorder operates similar to a "sniffer" by analysing pass-by communication packets. The recorder 226 records the packets corresponding to certain communication sessions based on its configuration. FIG. 1 shows a typical deployment of passive tap recorders in a contact center. In an IP telephony environment 219, recorders are typically deployed either at the voice gateway, which interfaces between Internet Protocol (IP) network and public switched telephone network (PSTN), or at switches in order to stay along the routes of the communications. This technique has the advantages of (1) minimum intrusion to a communication system, (2) cost effectiveness in deployment for companies with centralized office locations, and (3) easy scalability for compliance recording. However, for companies with many distributed branch offices, the above advantages start to diminish. This is especially true if the purpose of the recorders is for quality monitoring.

First, with the growing usage of Voice over Internet Protocol (VoIP) technology 219, many telephony-based businesses, such as contact centers, are adopting distributed telephony systems 209, 223, 236, 292 with local access to PSTN 216, 233, 508, 608, which are still controlled by centralized soft switches 213, 231. Many contact centers are using at-home agents with soft-phones on their personal computers (PCs). The distributed telephony system makes "recording along the communication routes," needed for passive tap recording, difficult. Secondly, network security has now become a concern. The deployment of encryption technology has made passive tap recording become even more problematic.

In addition, many contact centers deploy recorders for quality monitoring purpose, in addition to compliance. In this regard, only a small percentage of the communications are recorded and monitored. However, to assure the accuracy of the sampling, communications are randomly selected for recording across all branch offices. With passive tap recording, a large number of recorders will be required and each recorder will have very low usage.

A typical IP-based contact center using the passive tapping "sniffing" recording method is shown in FIG. 1. Two branch offices 100, 101 are shown in the figure. To communicate with any agents at the contact center, a customer communication device 120, such as a time domain multiplexing (TDM) or an IP phone, first sends communication signals to a call-processing device 125A, 125B of the contact center, such as a soft switch. The communication signals can be sent either directly to the call-processing device in case of IP to IP communications or via a media processing device, such as a voice gateway in case of TDM to IP. The communication network 150 can be a PSTN network or IP-based network. Once the communication signals have been received, the call-processing device 125A, 125B then routes the communication signals to an agent phone 175A, 175B, 175C, 85A, 185B, 185C.

After several rounds of communication signals exchange, media communications between the agent's phone and customer's phone can proceed via media processing device and distribution devices. The distribution devices are network routers and switches. In order to record the media communications using passive tapping, recorders 165A, 165B are deployed at the media processing device or distribution devices 170A, 170B using the network traffic monitoring or duplicating features, such as the Cisco's Switch Port Analyzer (SPAN) feature, on these devices. These tapping features are often available to the recorders that are directly connected to the media processing device 125A, 125B or distribution devices 170A, 170B, namely to recorders deployed at each branch office. Hence, a large contact center having multiple branches, such as a branch in New York, a branch in Los Angeles, and a branch in Chicago, may need multiple recorders in each branch to record the media communications.

The above description of recording operations reaches yet another hurdle when video data is added to the mix. Techniques that were previously used in audio recording cannot immediately convert to handle video data. This is particularly true in terms of storing long term audio and video data in a compressed state. For example, audio/voice data may be transmitted across a network in a native state at 64 kbps. Modern compression techniques, however, allow for that data to be stored with sufficient integrity at 5.3 kbps. The same is not true for video data, which may be transmitted at 4000 kbps and stored in ranges of 500 kbps. Screen data transmitted across a network has even greater compression requirements in which screen data transmitted at 4000 kbps may be stored at a rate of 5 kbps. Accordingly, new techniques for transmitting and storing both audio and video data in a network setting are necessary for modern file retention policies and government regulated procedures for storing data.

BRIEF SUMMARY OF THE DISCLOSURE

A system for data recording across a network includes a session border controller connecting incoming data from the network to an endpoint recorder. A load balancer is connected to the network between the session border controller and the endpoint and receives the incoming data from the session border controller, wherein the load balancer comprises computer memory and a processor configured to parse the incoming data into video data and audio data according to identification protocols accessible by the processor from the computer memory. A recording apparatus includes recording memory that receives the incoming data from the load balancer, stores a duplicate version of the incoming data in the recording memory, and connects the incoming data to the endpoint.

DETAILED DESCRIPTION

Figure 1:
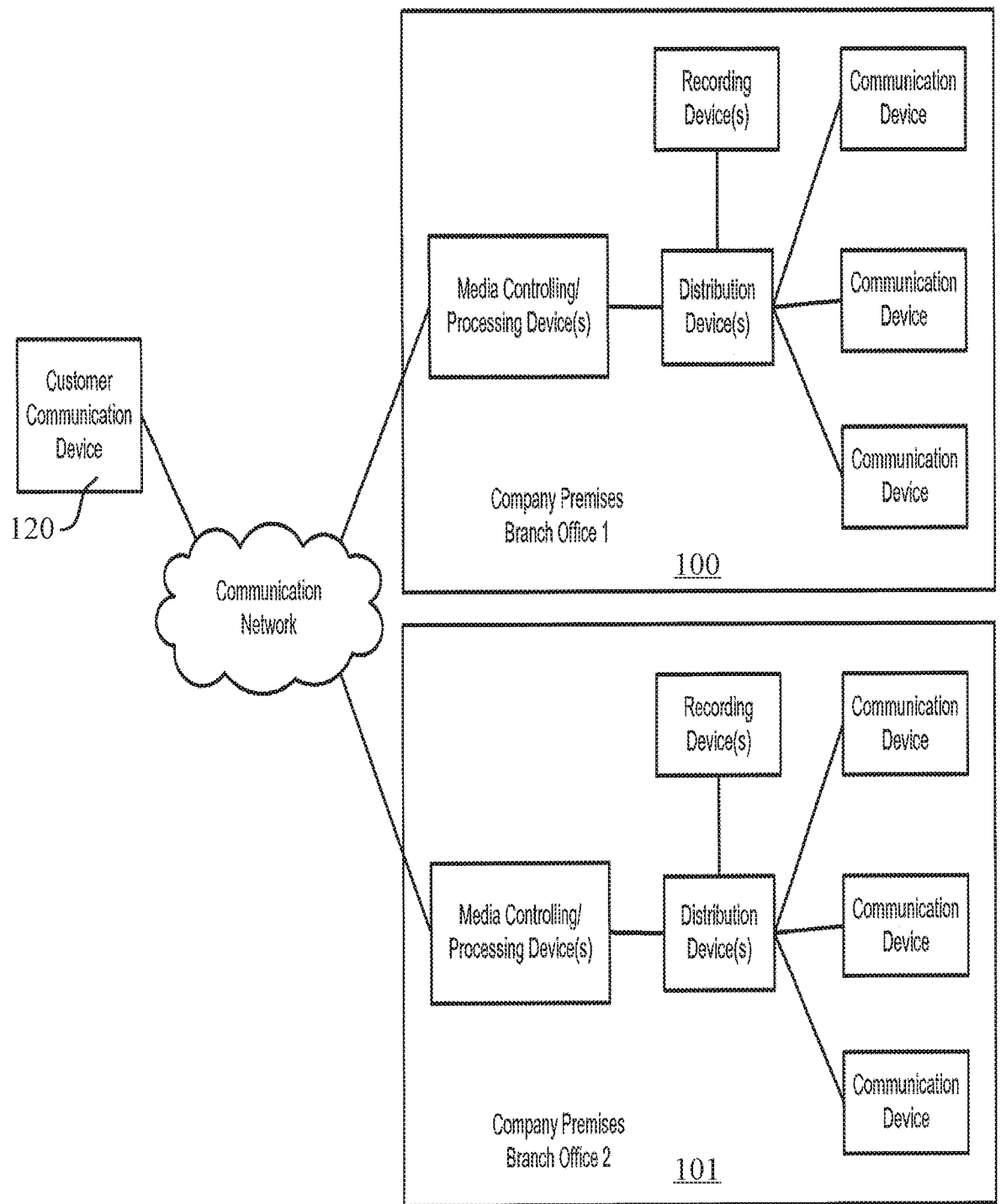
FIG. 1 is a schematic diagram of an embodiment of a prior art system for passive tap recording in a multi-campus network.

Disclosed herein are systems and methods for recording multimedia communication signals without requiring recording devices to be deployed along the route of the two end points of the communication. In particular, the recording of the communication signals can be achieved using a soft switch, a conference bridge, a phone, a multi-media communication device, a computer having a CPU and camera/video capabilities and/or a media application server.

Exemplary systems are first discussed with reference to the figures. Although these systems are described in detail, they are provided for purposes of illustration only and various modifications are feasible. After the exemplary systems are described, examples of flow diagrams and sequence diagrams of the systems are provided to explain the manner in which communication signals can be recorded. This disclosure references numerous kinds of data for recording during normal business operations, and the data is not limited to any single protocol or payload content. References to multimedia data include, and are not limited to, text data, image data, audio/voice data, video data, computer screen data, live transmission, recorded transmission, still images, moving images, compressed audio, screen data, and video, and natively transmitted audio, screen data and video, just to name a few examples. This disclosure refers to a network and systems connected across network connections 288, which can include, without limitation, wired, wireless, optical, acoustic, or any other kind of data transmission protocol and medium. References to "phones" and similar terms are not limited to traditional voice processing telephones or even smart phones, but instead, this disclosure relates to all kinds of computer integrated telephony devices 209, 223, 236 that enable audio, video, and interfaces for sharing data across a network, wherein the telephony devices include the components shown in FIG. 2B, such as but not limited to a processor 282, volatile and non-volatile memory 284 with an operating system 286 and communications software 299 configured to connect to a local interface 292, a network interface 288, a display interface 294, data storage 295, and I/O interfaces 296.

Figure 2A:
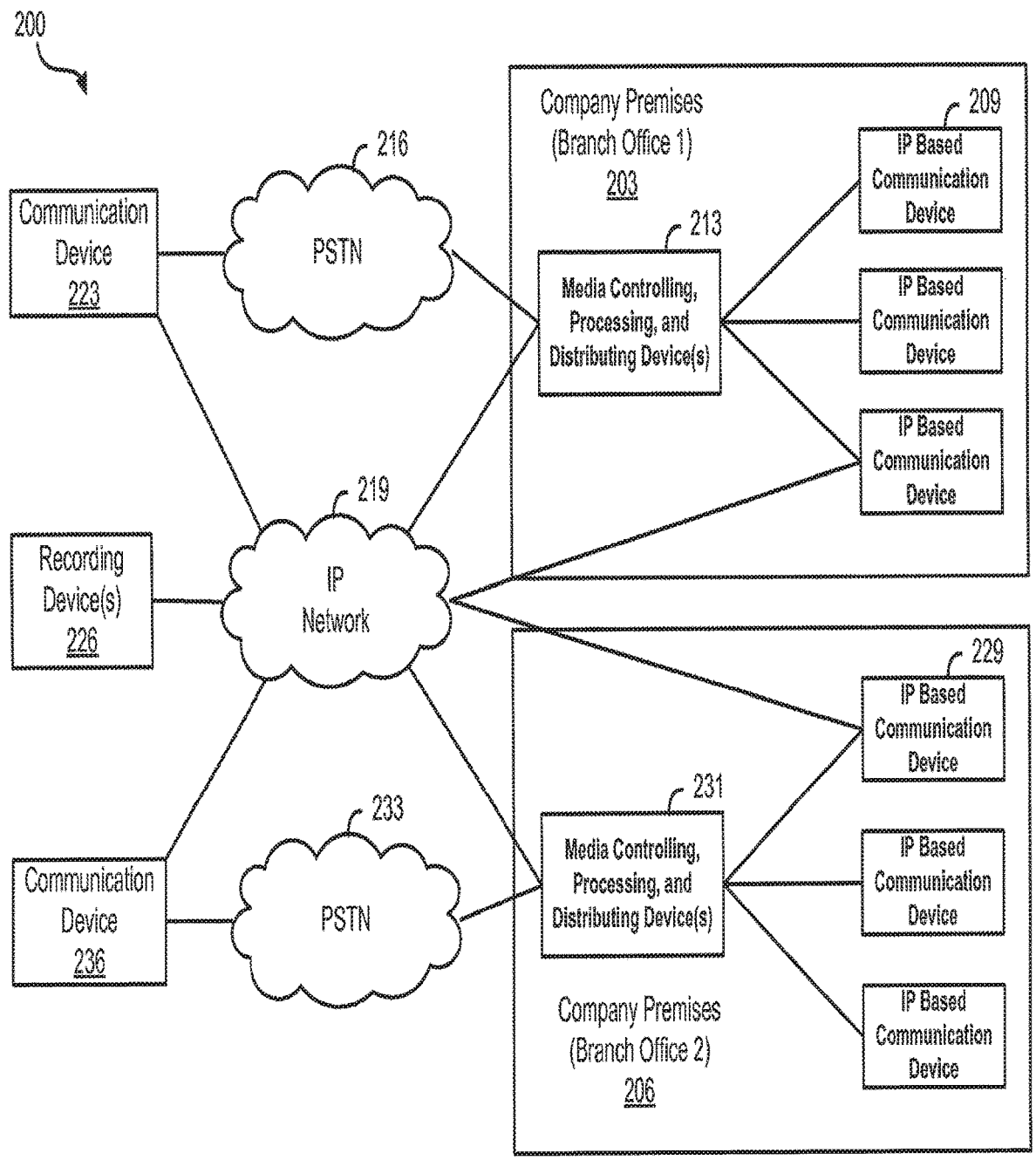
FIG. 2A is a schematic diagram of an embodiment of a system in which multimedia communication at a company can be recorded by an endpoint recorder located anywhere on an IP network connected to the company.
Figure 2B:
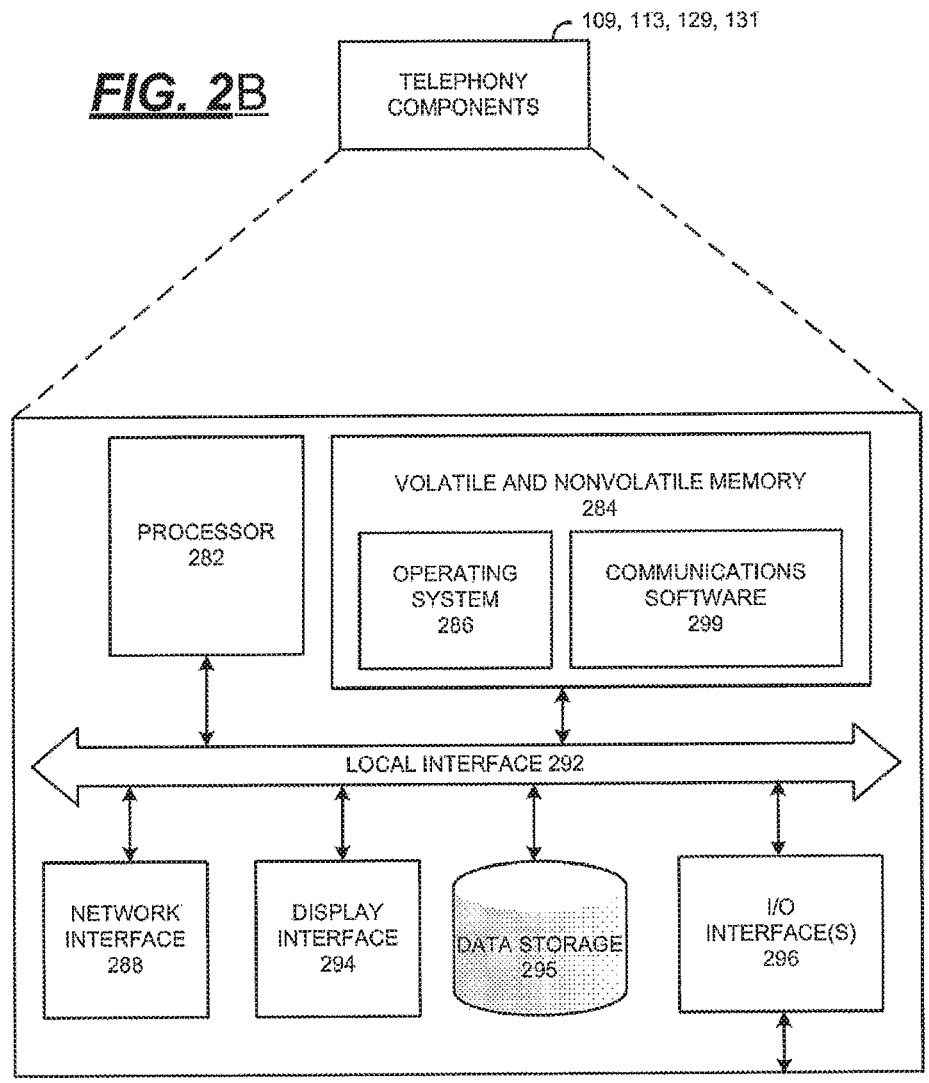
FIG. 2B is a schematic diagram of an embodiment of a system in which hardware architecture transmits and receives multimedia data via local interfaces in a network.

Referring now in more detail to the figures, FIGS. 2A and 2B are schematic diagrams of an embodiment of a system in which media communication at a company can be recorded by an endpoint recorder 339 located anywhere on an IP network connected to the company. Regarding system 200, FIG. 2A, two branch offices 203, 206 of a company may need to record communications between employees and between employees (or "agents") and customers. Customer communication devices 223, 236 connect to branch offices 203, 206 either via an IP network 219 or via a PSTN network 216, 233, respectively. The customer communication devices 223, 236 can include, but are not limited to, telephony components 109, 113, 129, 131, including telephones 109, soft-phones 113 on hand held devices, personal computers 129, or any computerized device 131 or system capable of retrieving, processing, and transmitting multimedia data across a network.

Recording device(s) 226 can be deployed anywhere on the IP network 219 connected to the branch offices 203, 206. Alternatively, or additionally, the recording devices 226 can communicate with media controlling/processing/distributing devices 213, 231 in a secure fashion in encrypted environments, for getting communication events and for sending instructions. With the capability of the recording devices 226 to communicate with the media controlling/processing/distributing devices 213, 231, the recording device 226 can selectively record communications in the contact center based on business policy. Alternatively or additionally, if a recording device 226 is a cluster of recording devices, the recording device can communicate with the media controlling/processing/distributing devices 213, 231 to select which recording device 226 from the cluster of recording devices to record the communications for load balancing purposes.

The media controlling/processing devices 213, 231 control the communication between customers and employees and between employees. The media controlling/processing devices can include, but are not limited to, multimedia gateways, soft switches, conference bridges, and multimedia application servers. The distributing devices can include, but are not limited to, routers and switches. Based on static configuration or instructions from the recording devices 226, the media controlling/processing devices 213, 231 can duplicate and transmit on-going communication between communication devices 209, 229, 223, 236 to the recording devices 226 via the IP network 219 using its multimedia processing features. Alternatively or additionally, the media controlling/processing devices 213, 231 can also instruct a communication device 209, 229 at the company premises 203, 206, respectively, to duplicate and transmit any on-going communications to the recording devices 226 using media processing features on the communication devices 209, 229. The operation of the system 200 is further described in relation to FIG. 8.

Figure 3A:
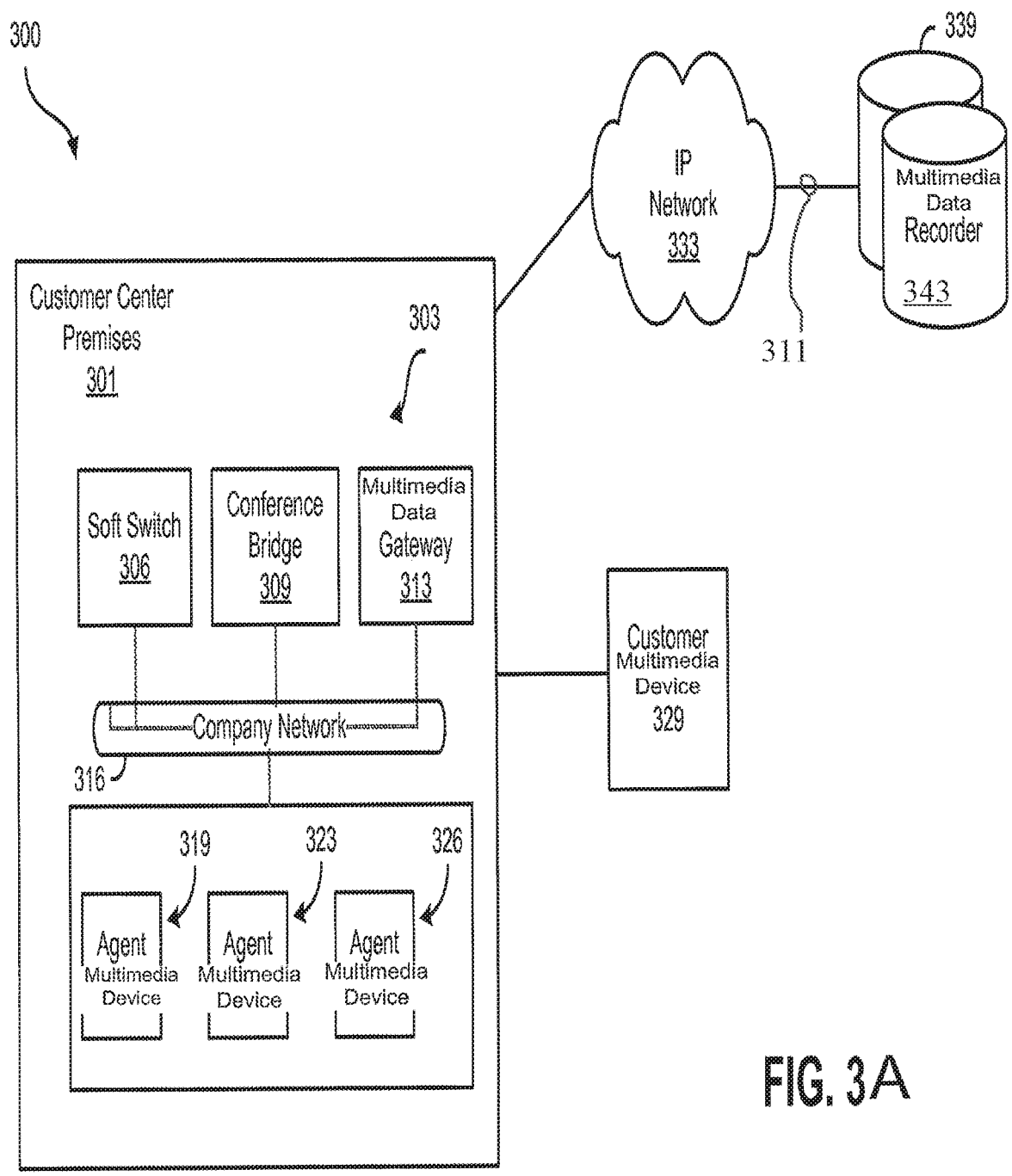
FIG. 3A is a schematic diagram of an embodiment of a system in which media communication at a contact center can be recorded by a multimedia endpoint recorder located anywhere on an IP network connected to the contact center using a conference bridge.
Figure 3B:
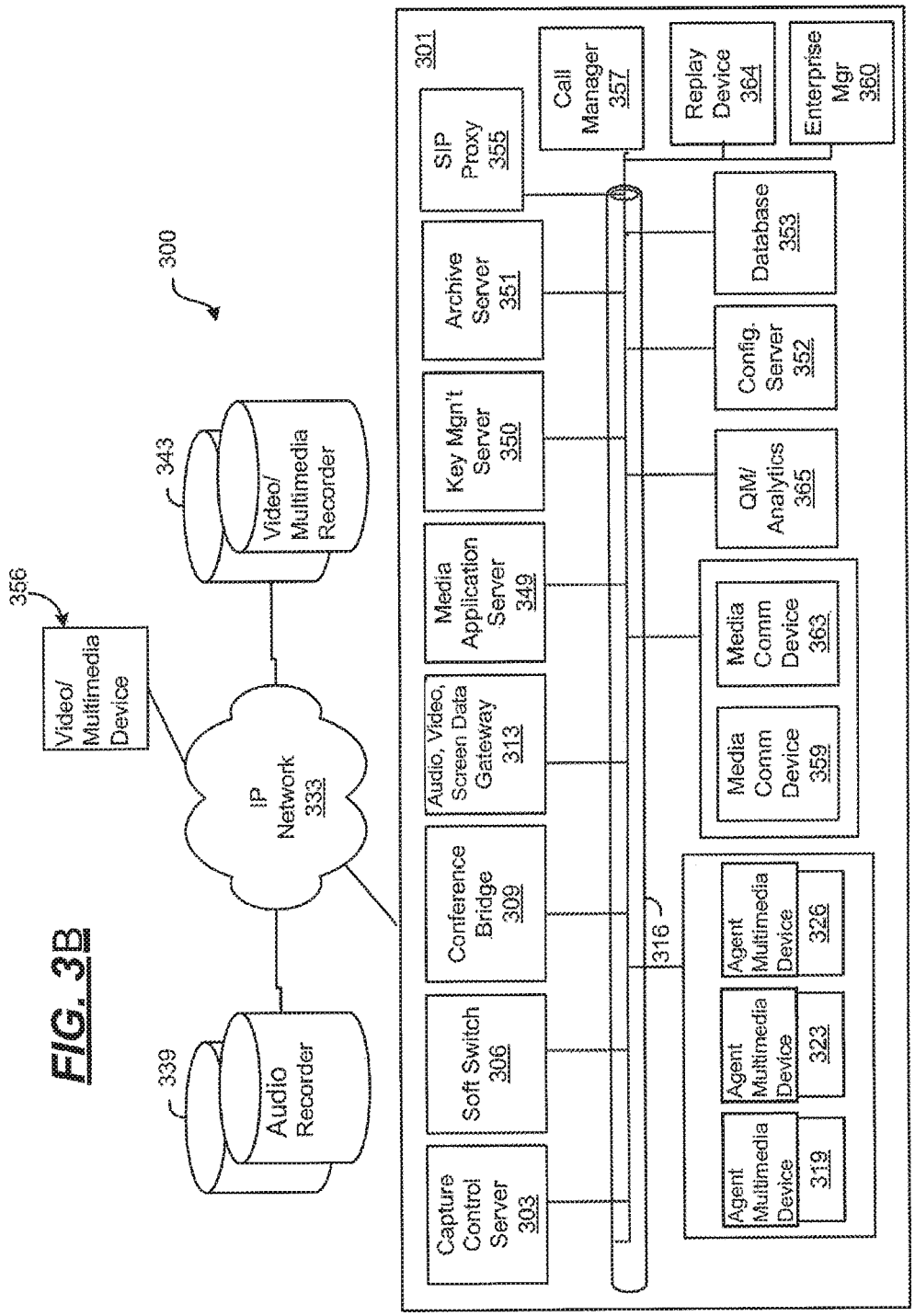
FIG. 3B is a schematic diagram of an embodiment of a system in which customer-agent interactions along a computerized interface are directed to at least one multimedia recorder by tapping communications at the agent computer.

FIG. 3A is a schematic diagram of an embodiment of a system 300 in which multimedia communication at a contact center 301 with connected components 303 can be recorded by an endpoint recorder 339, 343 located anywhere on an IP network 333 connected at link 311 to the contact center 301 in a company network 316 using a conference bridge 309. The endpoint recorders 339, 343 are configured for receiving, processing, and storing all kinds of multimedia data, with examples shown in the figures as audio/voice, video, and screen shots or screen scraping data. As indicated in this figure, the system 300 includes a contact center premises 301 run with a key management server 350 and an enterprise manager 360 that includes an IP telephony system 300 that enables communications between agent phones 319, 323, 326 and between agent phones and customer phone(s) 356. FIG. 3B illustrates, therefore, a user's phone as a video/multimedia device 356 connected across an IP Network 333 to audio recorders 339 and video/multimedia recorders 343 and further connected by communications link 311 to contact center premises 301. FIG. 3B illustrates the telephony environment of the contact center premises 301 as using a company network 316 to ultimately connect the user video/multimedia device 356 to agent multimedia device 319, 323, 326. The company premises telephony environment includes a capture control server 303, a soft switch 306, and audio, video, screen data gateway 313, key management server 350, a media application server 349, an archive server 351, an SIP proxy module 355, a call manager module 357, a replay device 364, a database 353, a configuration server 352, a quality management (QM) analytics module 365, and other media communication devices 359, 363. Use of the term "phones" includes all types and configurations of computerized devices 209, 223, 236, 329, and 356 operating as communication devices, including but not limited to computers, illustrated in FIG. 2B, fitted with two way live communication cameras and computer implemented telephony with components 286, 299, 294, 295. The IP telephony system 300 of FIG. 3A includes soft switch 306, conference bridge 309, voice gateway 313 and agent phones 319, 323, 326, all of which are connected to a company network 316. Calls from the customer phone 329 can be routed to a voice gateway 313, which can route the calls to the soft switch 306. The soft switch 306 receives incoming calls and routes the calls to the agent phones 319, 323, 326. The soft switch 306 communicates with the conference bridge 309 via the company network 316. The IP telephony system 303 communicates with a voice endpoint recorder 339 and multimedia data recorder 343 via an IP network 333. The company network 316 and IP network 333 can include, but are not limited to, a wide area network (WAN), a local area network (LAN), a virtual private network (VPN) and the Internet.

In this embodiment, the soft switch 306 is operative to send a command to the agent phones 319, 323, 326 and audio, voice, and screen data gateway 313 via the company network 316, instructing the agent phones 319, 323, 326 and audio, voice, and screen data gateway 313 to transmit media communications associated with the incoming calls through the conference bridge 309 via the company network 316. The soft switch 306 also sends a command to the conference bridge 309 via the company network 316 to duplicate and transmit the media communication to the voice endpoint recorder 339 using the IP network 333. The operation of the system 300 is further described in relation to FIGS. 8 and 9.

Alternatively or additionally, the soft switch 306 can receive instructions for recording the media communication from the voice endpoint recorder 339 via the IP network 333. In turn, the soft switch sends a command based on the received instructions to the conference bridge 309. Alternatively or additionally, the soft switch 306 can have capabilities of a conference bridge 309. That is, the soft switch 306 can duplicate and transmit the media communication to the voice endpoint recorder 339 without using the conference bridge 309.

Figure 4:
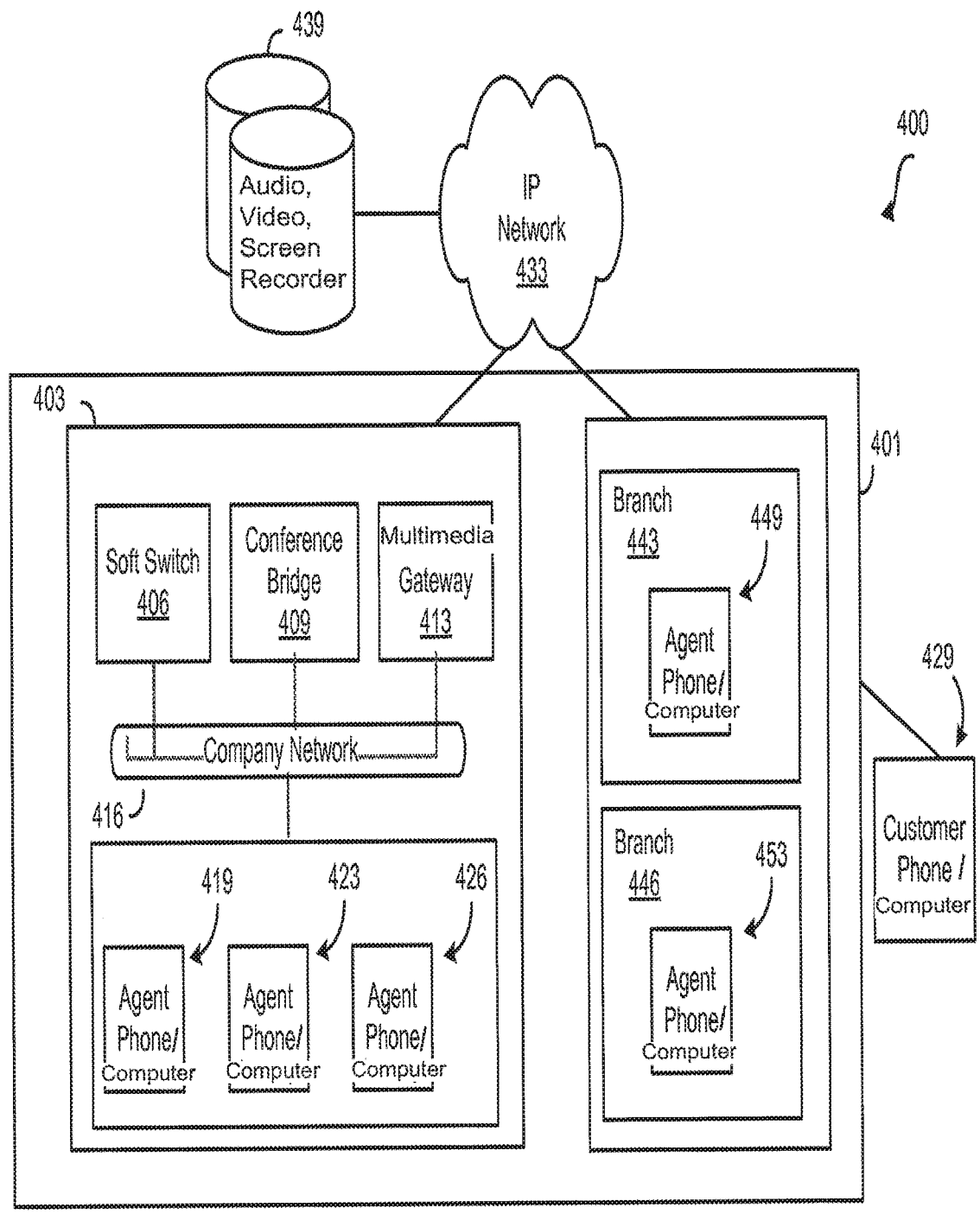
FIG. 4 is a schematic diagram of an embodiment of a system in which media communication at a contact center with multiple branch offices can be recorded by at least one multimedia endpoint recorder located anywhere on an IP network connected to the contact center using a conference bridge.

FIG. 4 is a schematic diagram of an embodiment of a system in which media communication at a contact center 401 with multiple branch offices that can be recorded by a voice endpoint recorder 439 located anywhere on an IP network 433 connecting to the contact center 401 using a conference bridge 409. System 400 is similar to the system 300 in FIG. 3 described above. That is, the system 400 includes a contact center premises 401, customer phone 429, company network 416, multimedia data gateway 413, IP network 433, soft switch 406, agent computers and phones 419, 423, 426 and endpoint recorder 439.

As shown in FIG. 4, the contact center premises 401 further include headquarters 403 that communicates with branches 443, 446 via the IP network 433. The headquarters 403 can be provided at one location, e.g., Chicago, and the branches 443, 446 can be provided at different locations, e.g., Los Angeles and Washington, D.C. Despite the different locations of the headquarters 403 and branches 443, 446, a multimedia communication can be recorded to a single multimedia endpoint recorder 439 using the conference bridge 409 and IP network 433. Note that the headquarters 403 includes a similar system as shown in FIG. 3. That is, the headquarters 403 includes soft switch 406, conference bridge 409, company network 416 and agent multimedia computerized communication devices 419, 423, 426.

Agent multimedia communication devices 449, 453 within the branches 443, 446 can receive media communications from within the contact center premises 403 or from customer phones and customer multimedia communication devices 429. The soft switch 406 can send a command to the agent devices 449, 453 instructing the agent devices 449, 453 to transmit media communication through the conference bridge 409 via the IP network 433. The soft switch 406 also can send a command to the conference bridge 409 via the company network 416 to and transmit the media communication associated with the agent phones 449, 453 to the voice endpoint recorder 439 using the IP network 433. The operation of the system 400 will also be described in greater detail in relation to FIGS. 8 and 9.

Figure 8:
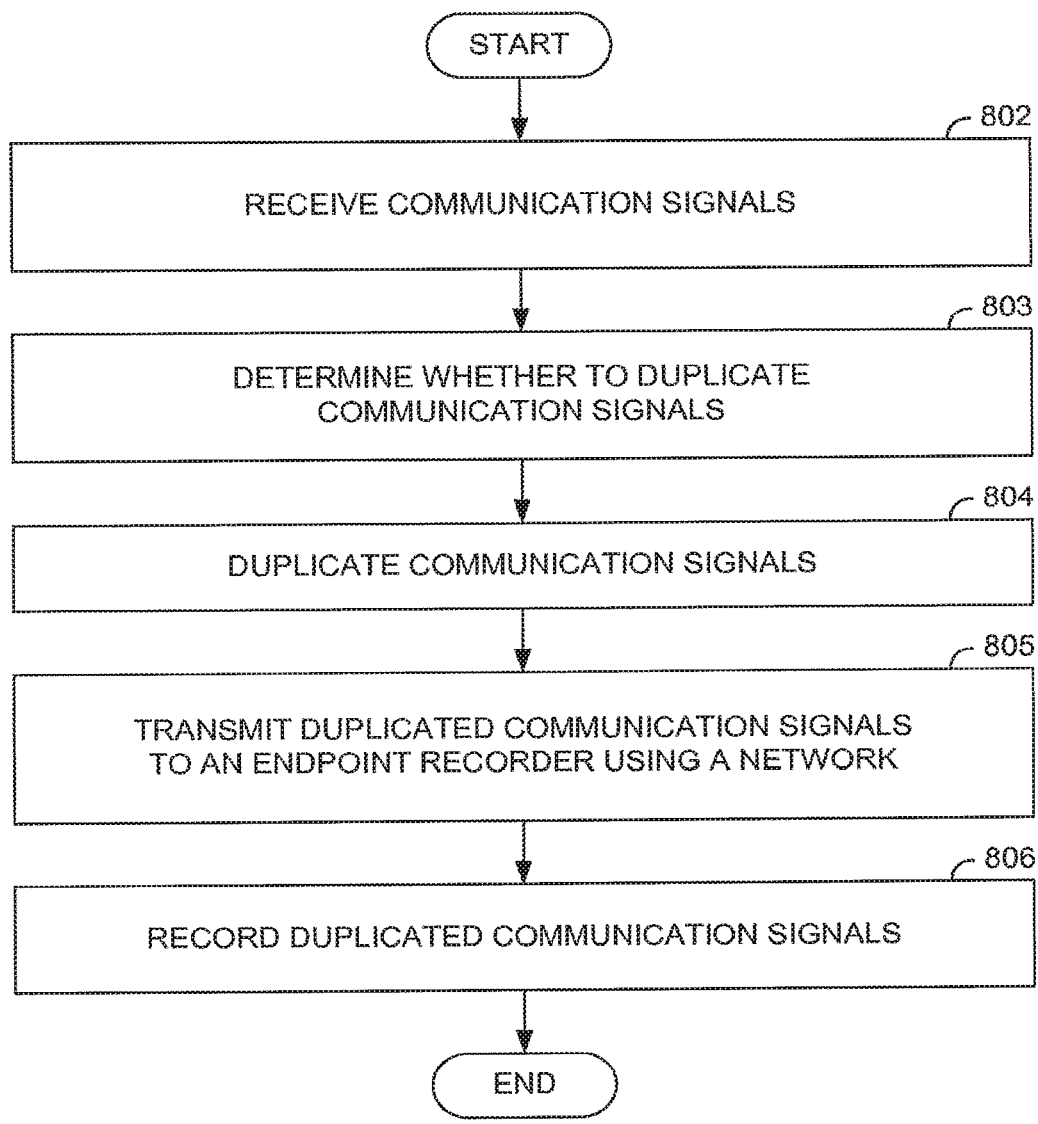
FIG. 8 is a flow diagram that illustrates an example of operation of a system such as shown in this disclosure.

FIG. 8 is a flow diagram that illustrates an example of operation of a system such as shown in FIG. 2. Beginning with block 802, communication signals are received in a contact center. In block 803, the contact center determines whether to duplicate the communication signals such as such as by using the media controlling/processing/distributing devices 213, 231, as shown in FIG. 2. Alternatively or additionally, a recording device can provide instructions to the media controlling/processing/distributing devices 213, 231 for recording the communication signals. In block 804, the contact center duplicates the communication signals such as by using the media controlling/processing/distributing devices 213, 231 or communication devices 209, 229. In block 805, the duplicated communication signals are transmitted to an endpoint recorder using a network. In block 806, the end point recorder records the duplicated communication signals.

As used herein, data gathered and recorded pursuant to the embodiments of this disclosure may incorporate audio, video, text, screen data or other data types as necessary to effect the purposes of this disclosure. Also, these systems are configurable for use with visual communication mechanisms, such as a sign language system using video data that may circumvent detection of communication via audio or text channels. Other data that may be gathered for analysis pursuant to the embodiments herein include the number, age, gender of people subject to video, audio, text, or other data communications discussed herein.

Session Boarder Controllers (SBC), Load Balancers (LB), and Gateways (GW) are present in some systems such that the multimedia audio, video, text, and/or screen data (or the like) will be streamed to a multimedia data recorder 343 from the session border controller, or the video gateway. The multimedia data may also be streamed to a recording location from a multimedia processing server 349 that is dealing with conferencing and compression services in the multimedia communication stream. In one embodiment, the system may utilize a session border controller with a data recorder inside for video/audio recording; this allows for using the session border controller to off load trans-coding functions to the lowest possible storage rate. All systems described herein also make use of forking capabilities, SIP recording 355, and correlating a call from a traditional telephone switch 508 to a recipient for recording through a voice over IP switch.

The use of a load balancer is also set forth herein, since video recording will initially be done using passive interception of the video communication, and the network traffic increases with video, there is likely a need to leverage load balancing technology to distribute the traffic intelligently across the cluster of recorders increases. Intelligent distribution of multimedia audio/video traffic includes enabling the load balancer to distinguish audio and video components. Heuristic analysis is necessary to incorporate identification protocols into a load balancer; a rules based analysis can be used to identify video and keep audio/video appropriately paired for arrival at destination.

The video and audio portions of a call are covered as well as the fact that the video and audio portions go to the same recorder or different recorders and that the recorders have the logic to associate the streams together. This disclosure explains the use of other call information from the control protocol such as SIP proxy 355 information or from a computer telephony integration ("CTI") type interface to gather appropriate data to associate matching audio and video data streams. The information originals from a network segment 500 connected via trunk 505 to a client segment 550. The information, e.g., originates from cell data 501 or landline data 502 across a cellular network or PSTN network 508.

Also this disclosure incorporates the scenario where the load balancer 514A, 514B does not exist between the session border controller 513A, 513B and the multimedia recorder 515A, 515B, for example one typical deployment might be a session border controller 513A, 513B communicating with a Recorder Control Server, and this determines recorders with free capacity or recorders closest to the session border controller 513A, 513B, such as archive server 351. The recording control server may utilize on-the-fly live adjustments to direct recording operations or other routing algorithms that instruct the session border controller 513A, 513B to forward the multimedia packets, such as text, screen data, audio or video to the archive server 351. In this case there is not a load balancer that the media streams are passing through on trunk 505.

One method and associated system may utilize a Duplication Media Streaming (DMS) protocol to support the streaming of the video directly to the recorders. Other embodiments described herein record incoming data in real time and directly stream the incoming data 311 to an endpoint 359, 363.

A system for data recording across a network 500 to a client segment 550 then may include a session border controller 513A connecting incoming data from the network 500 to an endpoint 515A, 515B, 515C, 515D, 515E, 515F, 515G. A load balancer 514A connected to the network between the session border controller 513A, 513B and the endpoint receives the incoming data from the session border controller 513A and gateway 509A. The load balancer comprises computer memory and a processor configured to parse the incoming data into respective screen data, video data and/or audio data according to identification protocols accessible by the processor from a computerized memory prior to sending the incoming data to IVR 510. A recording apparatus 515A-515G including recording memory receives the incoming data from the load balancer 514A, stores a duplicate version of the incoming data in the recording memory, and connects the incoming data to the PBX 511A and to the automatic call distribution center 512A and, during agent transfers, on to the endpoints 516A, 516B. The identification protocols utilize heuristic analysis of meta data that identifies portions of the incoming data. The heuristic analysis determines a data identifier selected from a file type, a data type, or a compression protocol for at least one portion of the incoming data. In one non-limiting example, the data identifier represents that the portion of the incoming data is a WAV file, an XML file, an SCN file, an FLV file, a WMV file or an MP4 file. As shown, the system includes back up computers for the gateway 509B, load balancer 514B, automatic call distribution (ACD) 512B, PBX 511B.

In one embodiment, a processor of the load balancer 514A, 514B parses identified portions for forking transmission of the respective portions according to a data identifier transmitted with the data stream. A data identifier may be a file type, certain objective meta data, a portion of a data stream header, or even an attribute of a data stream payload. A system of this embodiment utilizes the identified portions as are stored in respective sections of the recording memory according to the data identifier for each portion. The identification protocols used to process incoming multimedia data are stored in the memory for access by the processor as respective real time analytics modules and are subject to call for incoming data. The incoming data may originate from a first private branch exchange or any video management system connected to a subject network 500 and may be directed to at least one session border controller (SBC) 513A, 513B that may be positioned proximate a second private branch 511A exchange remote from the first private branch exchange.

Figure 5A:
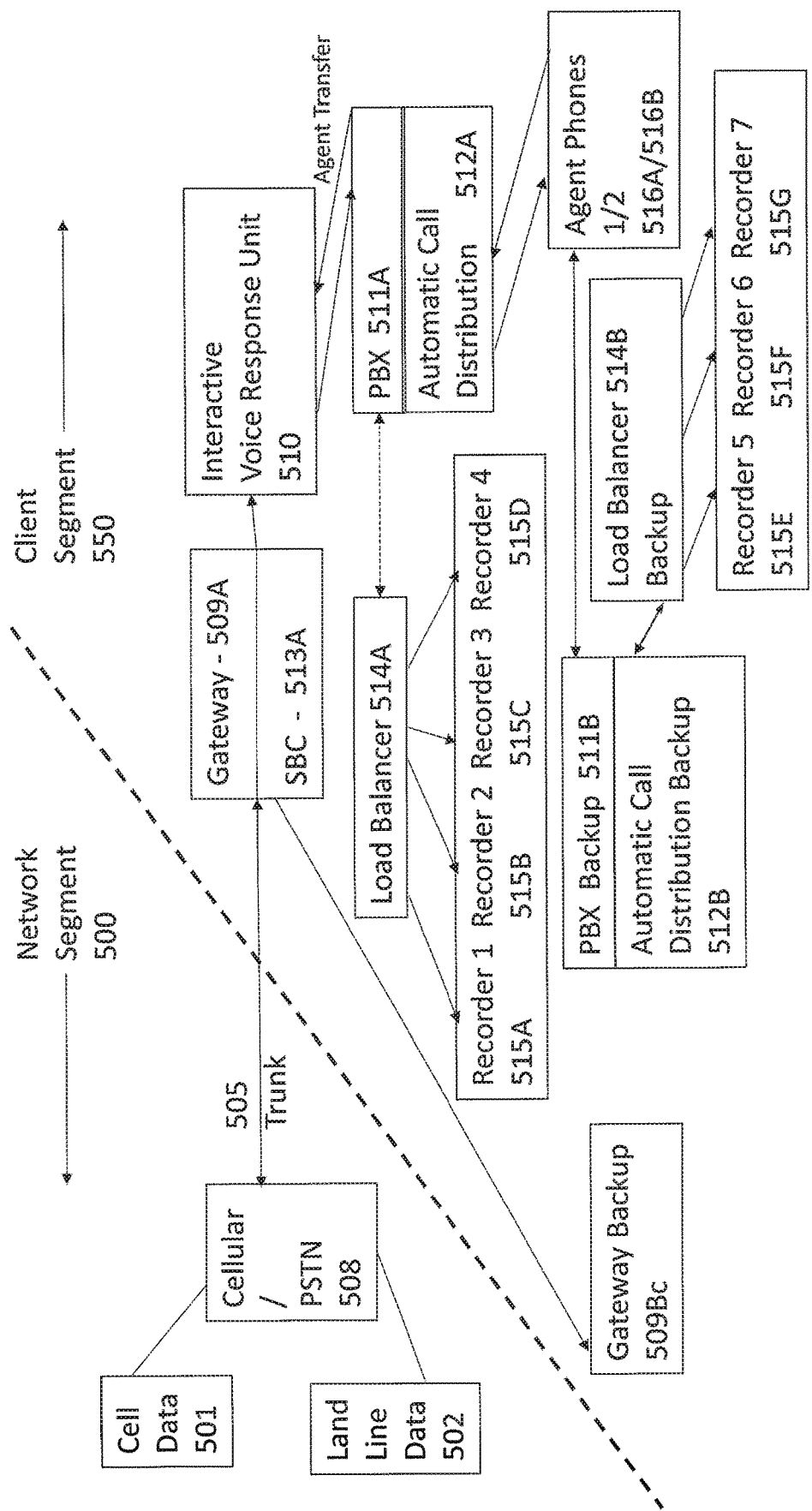
FIG. 5A is a schematic diagram of an embodiment of a system in which multimedia data is recorded across a network interface via a load balancer arrangement.
Figure 5B:
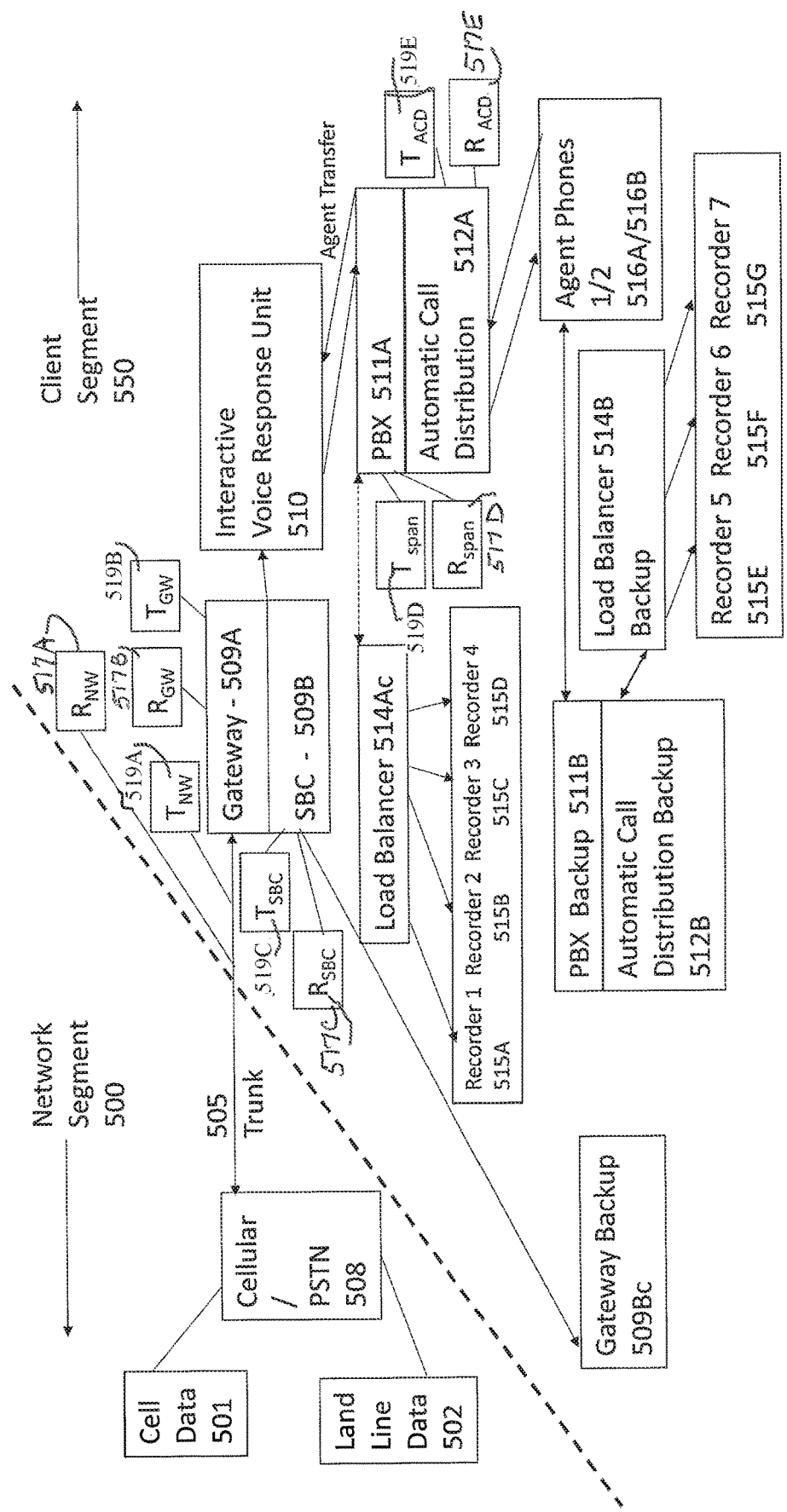
FIG. 5B is a schematic diagram of an embodiment of a system in which multimedia data is recorded across a network with strategically placed data taps connected to identified hardware at multiple locations.

In another embodiment of FIG. 5B, a system as described herein further includes a session border controller 513A, 513B housing encompassing the recording apparatus 517A, 517B, 517C, 514A, 514B and the load balancer. A video processing server receives the incoming data from the first private branch exchange and transmits the incoming data stream to the session border controller 513A in the second private branch exchange 511A.

A recording apparatus 515A-515H in the data path, and possibly housed within the session border controller 513A, 513B is configured for recording. The session border controller includes a session border controller processor configured for transcoding the incoming data according to audio or video data type.

The session border controller may further include a back to back agent module accessible by the processor for moderating the incoming data to the endpoint. In regard to a video back to back agent, the method and system of this disclosure includes a video solution incorporating hardware as a proxy for the video i.e., it is routed through identified hardware to a data recorder 515A-515H. The back to back video transmission device is the intermediary agent/recorder and a switch administrator programs the video back to back agent for proper security access to record.

In another embodiment, unique topologies available on or in system hardware and software configurations for devices including an interactive voice response system 510 that optimise the environment for large and widely distributed customers over variable geographic distances. This embodiment confers an ability to record full time audio with selective video and selective screen capture, and any combination of these being full time or selective recording. This is where, subject to configuration or rules programmed into either a server, session border controller, recorder, or other hardware, the decision to record any of the elements beyond audio is made selectively. This might be due to a randomising rule, a line of business rule, or $3^{rd}$ party tagging of the data. As discussed above, tagging may be incorporated via a data stream header or metadata transmission with multimedia data files. Options for using the time stamp on video/audio data and rebuilding the proper content at a remote location and taking drift across different systems into account.

The systems described herein are configured in computerized software with an ability to record audio, video and screen on the same computer implemented machine or different machines. This decision can be made intelligently based on topological information. For example, screen data displayed at either or both of customer 501, 502 and agent locales 516A, 516B may be recorded local to the agent site, whereas the audio and video may be recorded in the data centre since the traffic already flows through there. The hardware described herein, such as endpoint multimedia recorders 515A-515G, include an ability not only to record on different machines but also, at the time of replay, to rebuild the content from the different recorders for replay.

Video may be recorded on a different recorder to its audio due to differences in retention and storage requirements. Audio may be kept for life of a retention policy, whereas there may be no requirement to store the video long term and, therefore, video data, which requires a larger amount of storage memory, may be allowed to just roll off the buffer. Equally, the audio, video and screen data may all have different retention policies which are subject to rules driven by configuration and rules which may determine recording times based on the above described tagging of files or associated metadata. The tagging on files related to a call or multimedia agent-customer interaction may include information such as agent identification, extension numbers, customer account numbers, DNIS, ANI, CLI or any other tagged data in the multimedia data streams. In one point of consideration, tagging content in video/audio/screen data storage may be examined and utilized along numerous points in a recording process. This tagging may instruct hardware, via computer implemented machine instructions, to implement a recording system with: (a) down sampling for long term storage (b) consideration of international laws on kinds of screen/audio/video required to be secured in all circumstances such as ATM transactions; (c) desktop applications, kiosk applications and particular hardware/algorithms implicated in each.

The use of topology information can be used to determine which of the multimedia streams 359, 363 relates to the agent 319, 323, 326 and which of the multimedia streams relates to the customer video/multimedia device 356. This will be important for optimising performance in the use of face recognition, in order to only carry out the comparison on the data stream with an external party where required, subject to configuration. The topology information may also be used to determine the emotions and other derived data from the video footage of video and audio data, corresponding to a customer at one work station or computer vs. the agent at another. Where conferences are involved video topology will be used to determine which stream to do multiple matches on vs the agent side.

The data transmissions discussed herein also use metadata analysis for fraud scoring of video/audio/screen capture; same for quality scoring in the QM/Analytics module 365 and use of quality data to initiate other processes such as video image recognition. When dealing with conferences of high definition video recording, the multimedia data gathered according to this disclosure records multiple time entries for each participating agent in a multimedia conference. These multiple transmissions may become an issue, therefore, so the system will have the ability to determine, during multiple internal party conferences, to store certain kinds of multimedia data, e.g., the video data, on one channel but correlate the data to multiple parties. Such correlation thereby optimizes storage with the use of de-duplication of the video recordings by comparing time data among numerously transmitted multimedia data files.

In another embodiment, analysis of recorded data for payment card industry compliance may be used to identify certain regions and components of the computerized multimedia screen display and use data processing techniques to obscure (i.e., black out) certain multimedia data on a pixel by pixel basis. This process may further utilize text box identification in recorded data streams to allow for retroactive removal of certain portions of text, video and screen data that might not be suitable for storage or transmission outside of a single transaction. For instance, use of video/ screen data for recording signed documents and identifying the document later from storage in a search tool does not necessarily entail recording and storing all of the multimedia data available in a transaction. This system, therefore, uses down-sampling for long term storage after analytic processes are completed on multimedia data feeds and the system is configured to customize both the transmitted feed as well as the stored version. Accordingly, there are avenues available to give users the option of selecting among video call participants for recording. For example, the system may be configured for selecting one of several formatted call participants for recording, such as only one of an array of multimedia call participants. This example utilizes the concept that in many multimedia environments multiple participants can see every other participant, chosen participant, or just a subset of participants on respective computer screens (i.e., the screens of a multimedia transaction arrange particular video data in an arrangement that some might compare to the historical game show, Hollywood Squares or to the opening credit of The Brady Bunch on network TV where participants are arranged in an array. Proper storage and recording decisions in this arrangement could include gathering all of the participant data streams, some of the participant data streams, or maybe even just one of the multimedia data streams at issue. In other words, a call manager 357 and recording system according to this disclosure may make decisions, via artificial intelligence and heuristic analyses, based on decision data for each participant data stream that includes, but is not limited to, the above noted time stamps, tags, quality measurements, meta data, or even by using the delta signals of a gathered video/audio/screen sample. Decision protocols, programmed in computer implemented memory, will record certain components of interest according to a combination of the above described decision data. One goal is to have appropriate recording algorithms available for disparate multimedia data that are ultimately useful only if tied together via appropriate logic for recreating the gist of the interactions from a recorded and stored version, that may or may not include all of the participant data.

In order to improve the performance of the endpoint recorders not limited to video, but of particular value when considering video, certain embodiments of this disclosure utilize the ability to offload processor intensive work to one or more graphical processing units ("GPUs"), either co-resident in the machine doing the multimedia recording or in the recording system where a bank of GPU's is made available to provide processor services to the recorders. In this embodiment, the session border controller and/or the load balancer would likely be able to offload to a GPU certain activities such as format conversion and compression, particularly when considering the storage requirements for video; therefore, it will become important to compress to as small of a format as possible. It is envisaged the recorder will seamlessly use the GPU's both in real time compression activities and post process activities. In order to optimise the storage of the video, it may also be converted into a series of stills that are played by a replay device 364 like a flipbook, again with the purpose of saving storage. This might be done in real-time or at the point of long term storage.

Some goals of these embodiments described in this disclosure include maximizing the use of GPUs and application specific integrated circuits "ASICs" in the right context. These kinds of processes include proper offloading of processor intensive data manipulation, exploring the options and algorithms available for hand-off processing between CPU and GPU, assigning CPU reconstruction duties of a frame from video stream of delta signal and snapshots; decoding of picture frames to GPU; capturing desktop screen on CPU; and developing algorithms for assigning tasks properly between CPU and GPU. Other algorithms possible here include developing a scoring agent on a CPU such as quality of eye contact, eye movement, and smile quality. Data processing offloading algorithms in a database 353 connected to configuration server 352 further allow for intelligently selecting the appropriate hardware for particular tasks, such as using the GPU to decode (rapidly) certain triggers and scores and selectively moving processes to GPU, CPU, ASICs to enable, e.g., branch recording at a remote screen and putting proper analytics package in place that can implement video/audio/screen processing most effectively in a particular topology.

In embodiments of FIG. 5A and FIG. 5B then, a system for data recording across a network (500) includes incoming cellular data 501 and/or land line 502 through cellular or PSTN network 508 to client segment 550 and from the network to an endpoint set of recorders (515A-515G) and a load balancer 514A. In the embodiment of FIG. 5A, therefore, one schematic delineates the network segment (500) of a multimedia conferencing process to a client segment (550) of that process, such as client equipment agent phones 516A, 516B distributed across different campuses of an organization. The data flow of this embodiment connects multimedia network data to at least one of a gateway (509A) and a session border controller (513A) and the endpoint recorders (515A-515G). The example of FIG. 5A illustrates a multimedia data recording operation by which a redundant data gateway arrangement (509A, 509B) provide fail-over operations to allow for respective data recording and storage (515A-515D and 515E-G). The load balancer (514A) receives the incoming data from the session border controller 513A or gateway configuration 509A via a PBX 511A connected to an interactive voice response (IVR) system 510 and automatic call distribution manager (ACD) 512. The load balancer (514A), therefore, includes computer memory and a processor configured to parse the incoming data into data types, such as screen data, video data and audio data according to identification protocols available to the processor. The system further incorporates a recording apparatus 515A-515G comprising an archiving processor and archiving memory that receives a duplicate version of the incoming data from the load balancer 514A and stores the duplicate version of the incoming data in the recording memory. FIG. 5A also illustrates back up equipment providing redundancy in a gateway backup 509B, PBX backup 511B, ACD backup 512B, and load balancer 514B. At least one graphics processing unit (GPU) and at least one application specific integrated circuit (ASIC) may be connected to the recording apparatus 515A-515G, wherein the recording apparatus comprises an archiving module stored in said archiving memory, the archiving module configured to use the archiving processor to process portions of the duplicate version of the incoming data along with either the GPU or the ASIC. The gateway or session border controller creates the duplicate version and directs the incoming data to the endpoint via the load balancer. The GPU is used for format conversion, image decoding, and compression. The GPU is configured to process the portions of the duplicate version into image stills for storage. The archiving processor and ASIC are configured to construct frames of the duplicate version. Finally, the session border controller is configured as an SIP proxy for incoming data.

FIG. 5B illustrates all of the above noted components described in regard to FIG. 5A and shows a system for data recording across a network 500 includes incoming cellular data 501 and/or land line 502 through cellular or PSTN network 508 to client segment 550 and to an endpoint set of recorders 515A-515G and a load balancer 514A. In the embodiment of FIG. 5A, therefore, one schematic delineates the network segment 500 of a multimedia conferencing process to a client segment 550 of that process, such as client equipment agent phones 516A, 516B distributed across different campuses of an organization. The data flow of this embodiment connects multimedia network data to at least one of a gateway 509A and a session border controller 513A and the endpoint recorders 515A-515G. The example of FIG. 5A illustrates a multimedia data recording operation by which a redundant data gateway arrangement 509A, 509B provide fail-over operations to allow for respective data recording and storage 515A-515D and 515E-G. The load balancer 514A receives the incoming data from the session border controller 513A or gateway configuration 509A via a PBX 511A connected to an interactive voice response (IVR) system 510 and automatic call distribution manager (ACD) 512. The load balancer 514A, therefore, includes computer memory and a processor configured to parse the incoming data into data types, such as screen data, video data and audio data according to identification protocols available to the processor. The system further incorporates a recording apparatus 515A-515G comprising an archiving processor and archiving memory that receives a duplicate version of the incoming data from the load balancer 514A and stores the duplicate version of the incoming data in the recording memory. FIG. 5B also illustrates back up equipment providing redundancy in a gateway backup 509B, PBX backup 511B, ACD backup 512B, and load balancer 514B. In addition, FIG. 5B incorporates more strategic recording and storage options for the multimedia data described above. In the embodiment of FIG. 5B, the recording operations are strategically handled by intelligent and automated protocols for determining a tap location (T) for the data to be directed to a recorder (R) or recorders 515A-515G. In a data recording and storage operation, not only can the hardware such as a gateway 509A, session border controller 513A, or load balancer 514A (and the duplicate versions thereof 509B, 513B, 514B) apply logical operations on multimedia data, but an overall multimedia server (e.g., 349, 350, 352 of FIG. 3) may be implemented to manage tap locations (T) 519A, 519B, 519C, 519D, 519E that are available in the overall network (NW) of a gateway (GW), session border controller (SBC), automatic call distribution hardware (ACD), a switch port analyzer (SPAN). In this regard, a given network configuration may have at its disposal proper installations of recording equipment "R" 517A, 517B, 517C, 517D, 517E configured to tap, or access and direct, multimedia data at critical points in the architecture. As used herein, therefore, a tap is a hardware installation at strategic points in a network that a recording operation can locate, intelligently select, and command operation of data retrieval of multimedia data in a native format. FIG. 5B illustrates a tapping operation at tap points for a network tap ($T_{NW}$) 519A, a session border controller tap ($T_{SBC}$) 519B, a gateway tap ($T_{GW}$) 519C, or a tap for a switch port analyzer ($T_{SPAN}$) 519D connected to a PBX 511A. Appropriately configured computer readable and executable software may be used in conjunction with the appropriate hardware to determine which tap location is appropriate for a given scenario and kind of data. In multiple stream data sets, the logic used in the network monitoring and implementation may select a tap location that is the same for or different for any given set of data streams, even if all of the data streams are directly related to a single transaction. The above noted tags in a plurality of data streams may be utilized to access and assign a tapping point "T" with an associated recorder "R" 517A-$R_{NW}$ for a network tap recorder, 517B-$R_{GW}$ for a gateway tap recorder, 517C-$R_{SBC}$ for a session border controller tap recorder, 517D-$R_{SPAN}$ for a switch port analyzer tap recorder, 517E-$R_{ACD}$ for an automatic call distribution tap recorder across which a given data stream crosses between a user's cell data 501 input or land line data 502 input to a cellular or PSTN network 508 and to agent phones 516A, 516B. As illustrated in the figures, each tapping point, "T", may be associated with, or assigned to on an ad-hoc basis, a particular tap recorder "R" or end point recorder 515A-515G available on the network. Again, the assignments of a tapping point and a recorder, as well as the recording and storage format, may be made via heuristic analysis or artificial intelligence.

Figure 6A:
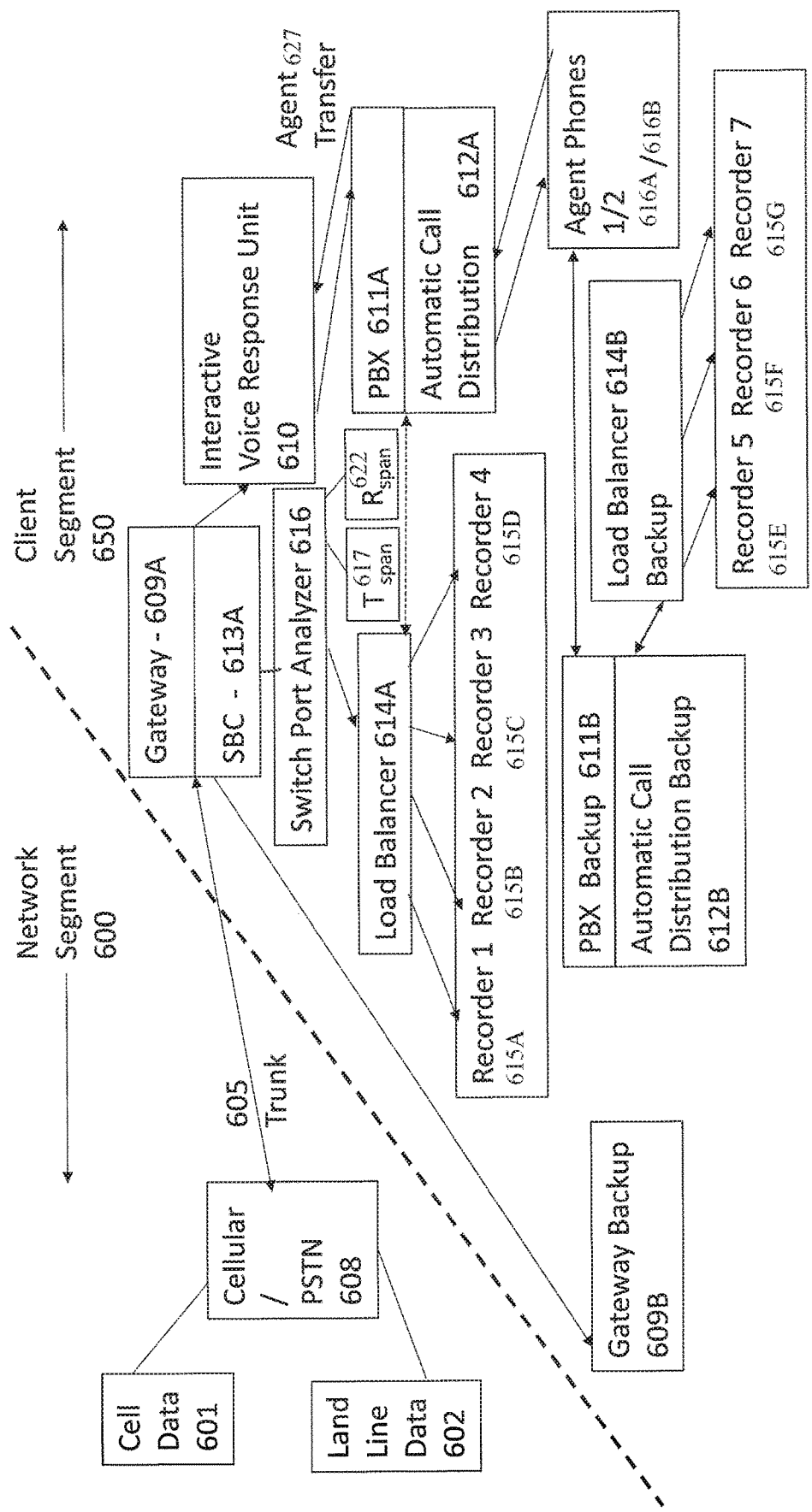
FIG. 6A is a schematic diagram of an embodiment of a system in which multimedia data is recorded across a network by tapping a switch port analyzer.
Figure 6B:
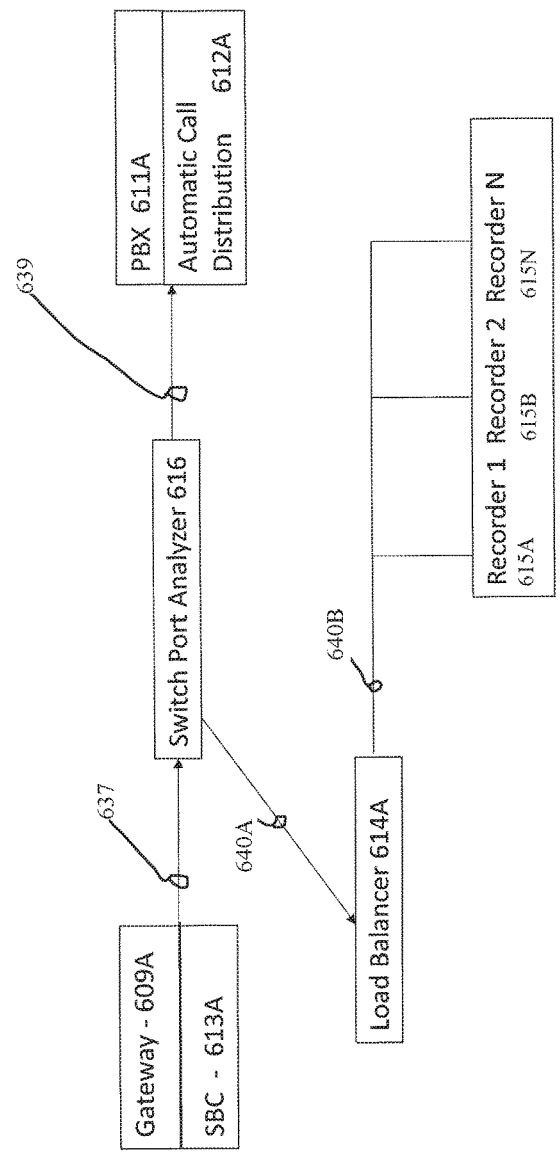
FIG. 6B is a schematic diagram of an embodiment of a system in which multimedia data is recorded across a network by tapping the switch port analyzer of FIG. 6A.

FIG. 6A illustrates all of the above noted components described in regard to FIGS. 5A and 5B and shows a system for data recording across a network 600 includes incoming cellular data 601 and/or land line data 602 through cellular or PSTN network 608 to client segment 650 and to an endpoint set of recorders 615A-615G across a trunk 605 and a load balancer 614A. In the embodiment of FIG. 6A, therefore, one schematic delineates the network segment 600 of a multimedia conferencing process to a client segment 650 of that process, such as client equipment like agent phones 616A, 616B distributed across different campuses of an organization. The data flow of this embodiment connects multimedia network data on the trunk 605 to at least one of a gateway 609A and a session border controller 613A and the endpoint recorders 615A-615G. The example of FIG. 6A illustrates a multimedia data recording operation by which a redundant data gateway arrangement 609A, 609B provides fail-over operations to allow for respective data recording and storage 615A-615D and 615E-615G via the tap location Tspan 617 at the switch port analyzer 616 discussed below. The load balancer 614A receives the incoming data from the session border controller 613A or gateway configuration 609A via a PBX 611A connected to an interactive voice response (IVR) system 610 and automatic call distribution manager (ACD) 612. The load balancer 614A, therefore, includes computer memory and a processor configured to parse the incoming data into data types, such as screen data, video data and audio data according to identification protocols available to the processor. The system further incorporates a recording apparatus 615A-615G comprising an archiving processor and archiving memory that receives a duplicate version of the incoming data from the load balancer 614A and stores the duplicate version of the incoming data in the recording memory. FIG. 6B also illustrates back up equipment providing redundancy in a gateway backup 609B, PBX backup 611B, ACD backup 612B, and load balancer 614B. In one embodiment illustrated in FIG. 6A, the network hardware encompasses at least one location for storing computer implemented software that automatically and selectively directs hardware components to be an active tap site for a particularly identified stream of multimedia data. In the example of FIG. 6A, one tap site of interest may be a switch port analyzer 616, denoted by its commonly used acronym "SPAN." The switch port analyzer 616 of FIG. 6A is positioned as an integral component of the communications between an automated call distribution center 612A having a private branch exchange (PBX) 611A or IP-PBX. The associated recorder $R_{SPAN}$ (622) may be particularly assigned in this embodiment to operations directing multimedia data streams to the recorder for storage and retention operations or to endpoint recorders 615A-615G.

Figure 6C:
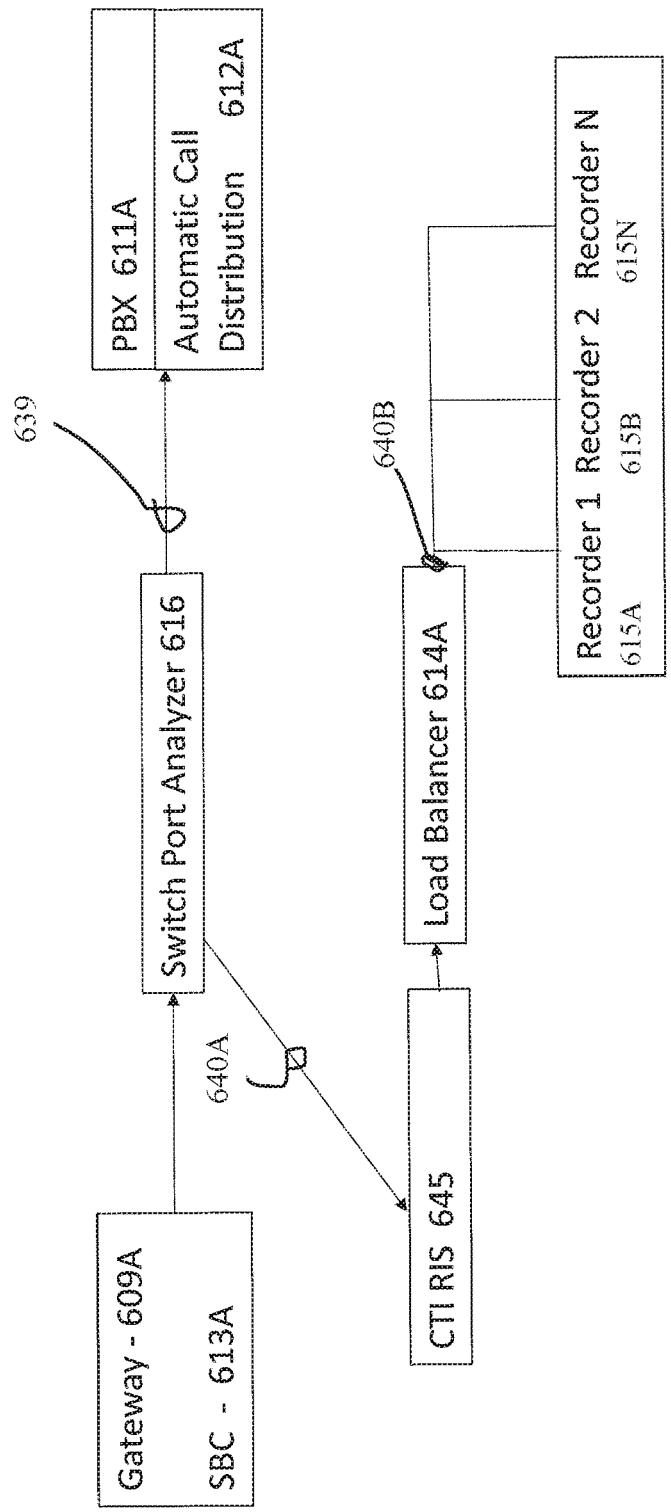
FIG. 6C is a schematic diagram of an embodiment of a system in which multimedia data is recorded across a network via computer-telephony integration utilizing a real time information server.
Figure 6D:
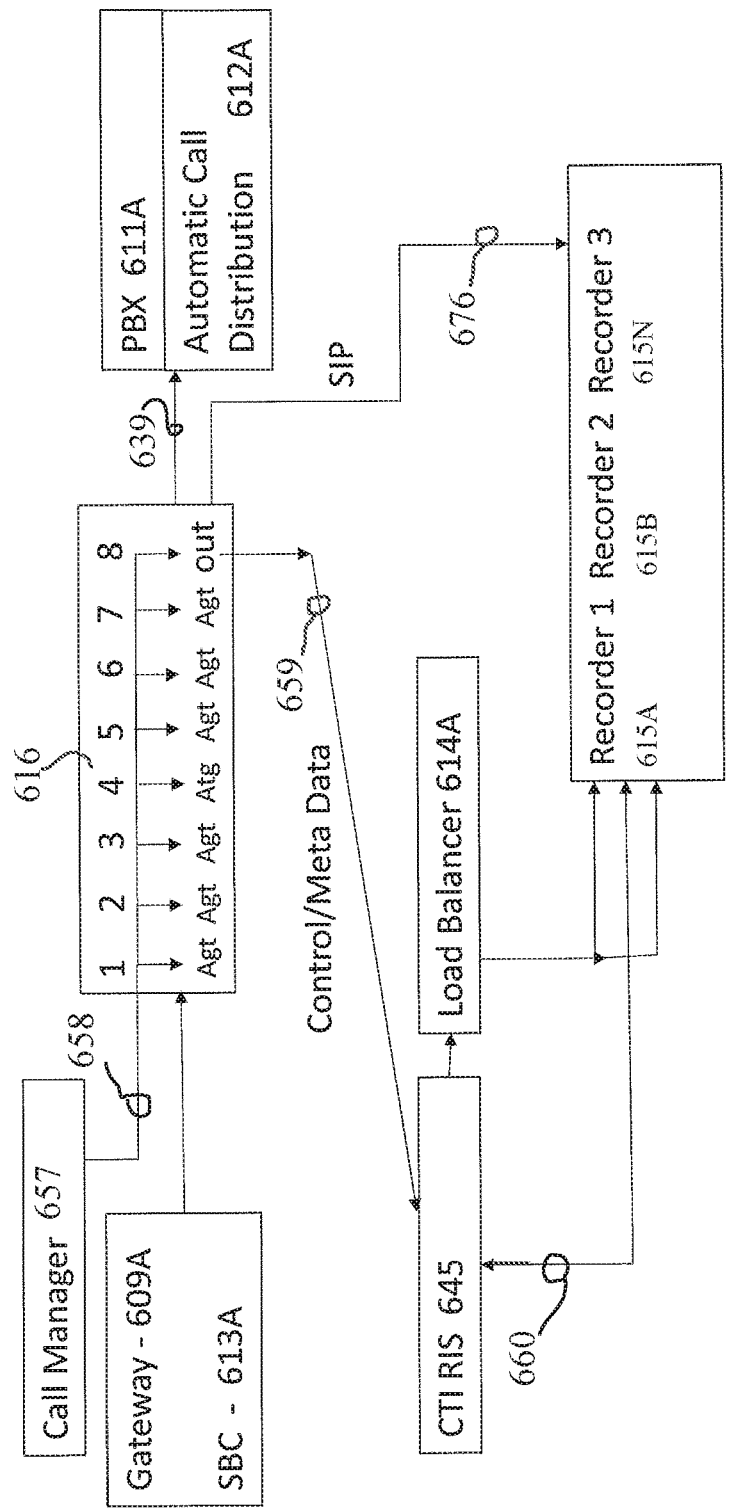
FIG. 6D is a schematic diagram of an embodiment of a system in which multimedia data is recorded across a network by tapping a switch port analyzer and recording data in conjunction with computer-telephony integration utilizing a real-time information server.

FIGS. 6B-6D provide numerous details of various configurations by which a single piece of hardware, for example only, the switch port analyzer 616 may be a decisive point in assigning a multimedia data stream 637 a destination or a portion of a network route upon receipt of the multimedia data stream 637 from a gateway 609A and an associated session border controller 613A, (i.e., as the switch port analyser 616 may determine which load balancing operation 614A to use or which endpoint recorder 615A, 615B, . . . 615N to be assigned for a data stream copy 640A from the SPAN 616 which is passed on to a recorder as an output 640B from the SPAN when the original version 639 of the data stream moves on through a network PBX 611A and automatic call distribution 612A. FIG. 6C utilizes the switch port analyzer 616 in connection with the private branch exchange 611A automatic call distribution software 612A to direct at least one of a multitude of data streams received from a gateway 609A and session border controller 613A. As noted in FIG. 6C, a copy 640A of the data stream 639 is directed to a real time information server (RIS) 645 configured for use with modern and smart computer telephony integration (CTI) that includes the above described load balancer 614A directing output data streams 640B to recorders 615A, 615B, to 615N while an original version 639 of the data stream flows to the PBX 611A and its automated call distribution software 612A.

FIG. 6D also shows that the switch port analyzer 616 may be a decisive point in assigning a multimedia data stream 658 a destination or a portion of a network route upon receipt of the multimedia data stream 658 from a gateway 609A and an associated session border controller 613A or via a call manager 657, (i.e., the switch port analyser 616 may determine which load balancing operation 614A) to use or which endpoint recorder 615A, 615B, 615C to be assigned for the data stream when the original version 639 of the data stream moves through the switch port analyzer (SPAN 616) on through a network PBX 611A and automatic call distribution 612A. The embodiment of FIG. 6D illustrates more detail of how the switch port analyzer SPAN 616 is configurable with multiple data streams (1-8) on each port that, in one embodiment, is a multimedia stream 658 directed to an agent from a customer via the gateway 609, session border controller 613A and call manager 657. The last port shown (port number 8) consolidates all of the streams and directs the consolidated signal 659 with the multimedia data stream, control data, and meta data to the real time information server (RIS) 645 for processing and possibly either direct assignment 660 to a recorder 615A, 615B, 615N or further analysis via a load balancer 614A for heuristics and recording assignments. SIP data 676 is also directed to a proper recorder.

Figure 7:
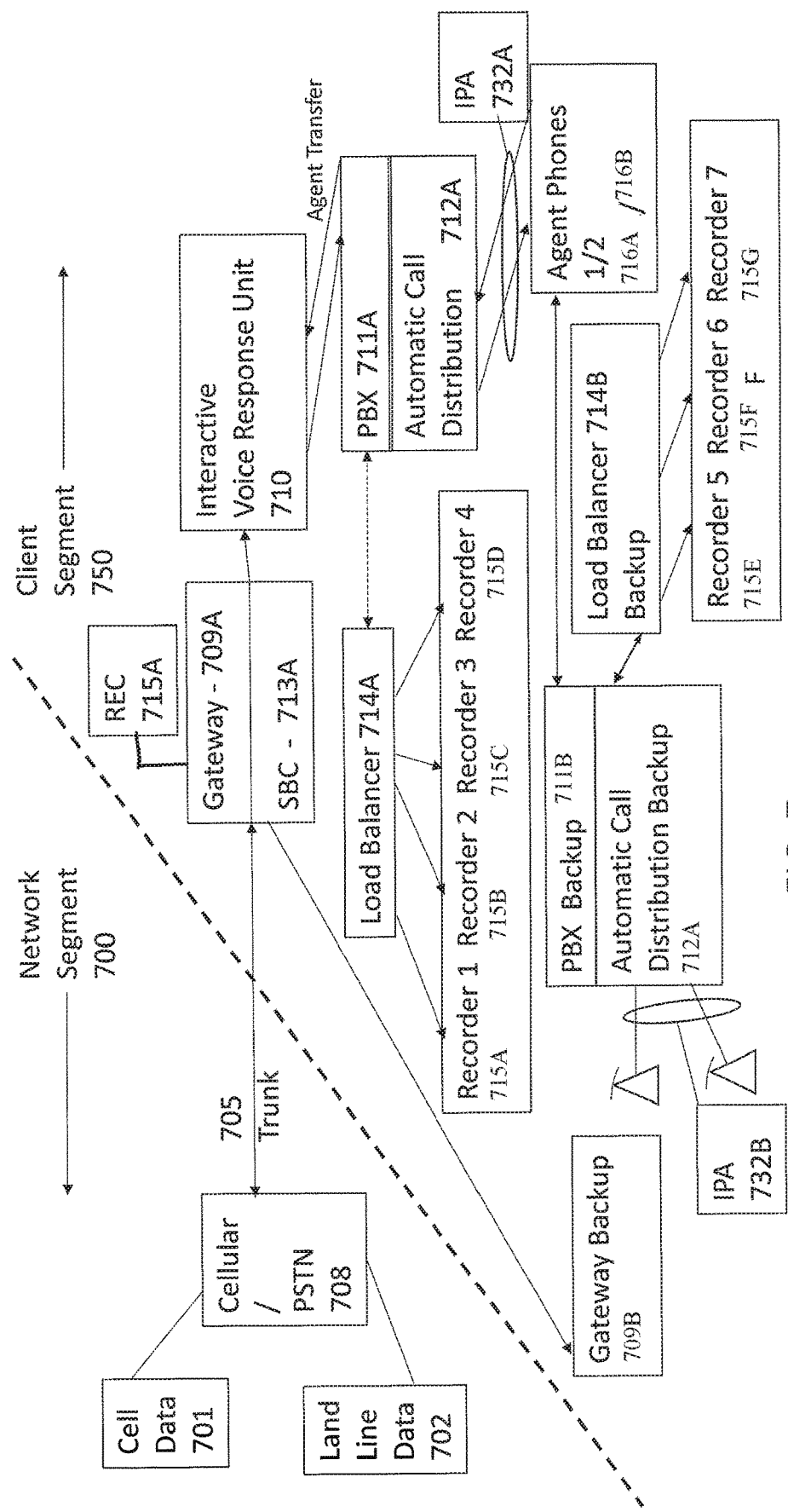
FIG. 7 is a schematic diagram of an embodiment of a system in which recording operations are managed in conjunction with an internet protocol analyzer.

FIG. 7 illustrates all of the above noted components described in regard to FIGS. 5A, 5B, 6A, 6B and shows a system for data recording across a network 700 includes incoming cellular data 701 and/or land line 702 through cellular or PSTN network 708 to client segment 750 and to an endpoint set of recorders 715A-715G and a load balancer 714A across trunk 705. In the embodiment of FIG. 7, therefore, one schematic delineates the network segment 700 of a multimedia conferencing process to a client segment 750 of that process, such as client equipment agent phones 716A, 716B distributed across different campuses of an organization. The data flow of this embodiment connects multimedia network data to at least one of a gateway 709A and a session border controller 713A and the endpoint recorders 715A-715G. The example of FIG. 7 illustrates a multimedia data recording operation by which a redundant data gateway arrangement 709A, 709B provide fail-over operations to allow for respective data recording and storage 715A-715D and 715E-715G. The load balancer 714A receives the incoming data from the session border controller 713A or gateway configuration 709A via a PBX 711A connected to an interactive voice response (IVR) system 710 and automatic call distribution manager (ACD) 712. The load balancer 714A, therefore, includes computer memory and a processor configured to parse the incoming data into data types, such as screen data, video data and audio data according to identification protocols available to the processor. The system further incorporates a recording apparatus 715A-715G comprising an archiving processor and archiving memory that receives a duplicate version of the incoming data from the load balancer 714A and stores the duplicate version of the incoming data in the recording memory. FIG. 7 also illustrates back up equipment providing redundancy in a gateway backup 709B, PBX backup 711B, ACD backup 712B, and load balancer 714B. FIG. 7 illustrates yet another option in determining a network route, data format, compression state, recorder assignment, and tap point location for multimedia streams of data. The embodiment of FIG. 7, shown with duplicate hardware (A, B) for failsafe operation, further incorporates an internet protocol analyzer ("IPA") 732A, 732B. The IPA 732A, 732B may be configured to work with associated computerized machines to identify data streams that should be paired for long term storage. This kind of pairing requires in depth consideration of the kinds of data, the data tagging, the signalling information, and the like for ultimately assigning a recording device.

One non-limiting goal of the embodiments of this disclosure is that of recording multimedia data with the goal of eventually synchronizing component parts of a given transaction for record keeping and retention purposes. Pairing the data appropriate, regardless of which network route 1020, 1030 or hardware the data passes through, is important because if, for example, audio data and video data are "off" synchronized by as much as one tenth of a second, the delay is noticeable to the human brain. Also, some of these kinds of delay may be cumulative in certain configurations and must be accounted for in the recording operations.

While it may be desirable for components of a given multimedia communication session or transaction to follow the same network route, utilize the same hardware, and end up for recording at the same location, such precisely identical data management scenarios are often not possible. Recording systems, therefore, often must pair screen data, audio data, and video data according to know procedures by using the above described tagging operations as well as meta data and operational data gathered by various components of the network. In some instances, the signalling components of a data stream may be sufficient to provide information about a data set or a multimedia file so that it may be paired with related constituent parts of a communication session. In other operations, however, hardware along the network, such as the load balancer, gateway, session border controller, and the like may need to be configured for certain analytical procedures. Again, one goal of the comprehensive network architecture is not only to handle bi-directional communication during a transaction or communication session, but also to record the bi-directional communication in an optimal manner, considering variables such as retention time, compression states, and locations for tapping and recording. These kinds of procedures assist in not only providing a multimedia communications session in which data drifting out of synchronization is prevented but also the data is recorded in a way that allows for playback with network parameters taken into account.

Figure 9:
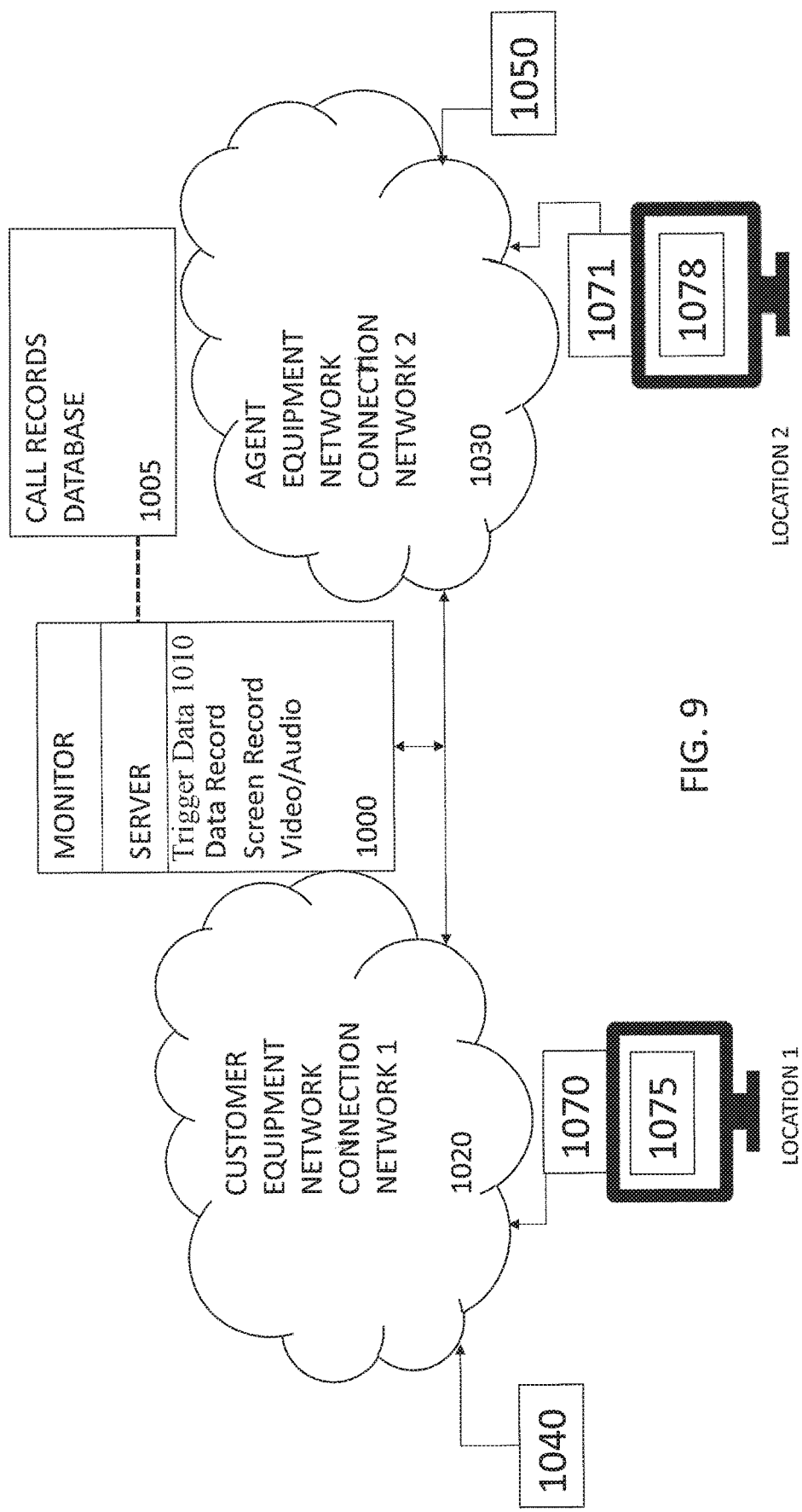
FIG. 9 is a sequence diagram of an embodiment of a system in which multi-campus communications between agents and customers are recorded via a multimedia application server as described herein.
Figure 10:
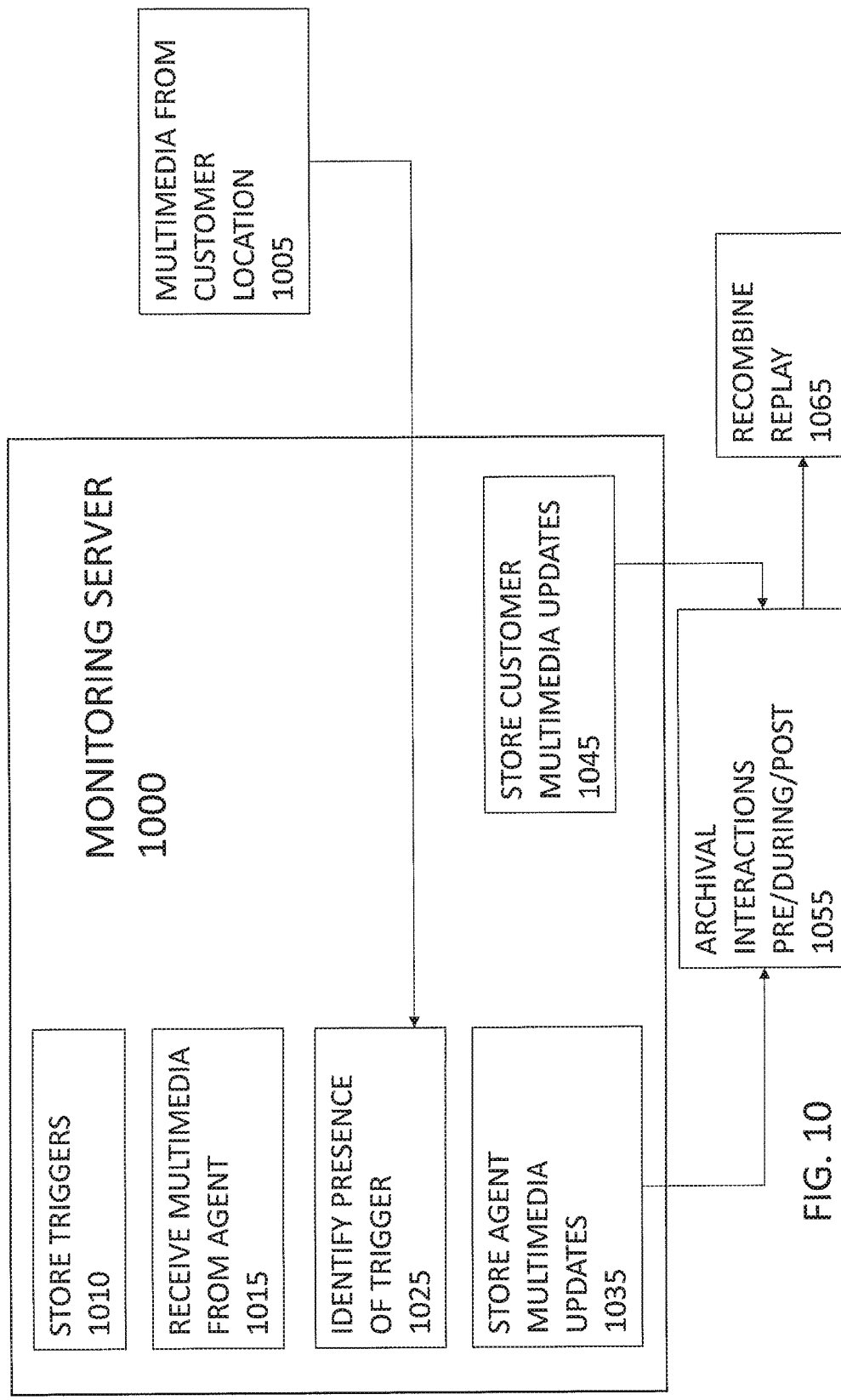
FIG. 10 is a flow chart of recording operations of a system shown in FIG. 9.

FIGS. 9 and 10 collectively illustrate at least one exemplary embodiment of the system described herein that allows for proper recording and storage of data related to agent and customer interactions in a commercial environment. In this example scenario, a customer walks into a branch, is initially picked up by the CCTV cameras such as but not limited to security cameras 1040, and the customer proceeds to the video kiosk 1075 where they then speak, via video link 1070 to an agent with a video link 1071 on a computer 1078 in a contact center. The same kind of environmental camera 1050 may be present on the agent operation side of the transaction so that various wide view perspective data may be gathered. Once the conversation has ended the customer then leaves the kiosk and is again picked by the CCTV security cameras 1040. The customer's progression across the premises may include briefly speaking to another member of staff in the branch before leaving. In this scenario all video from the engagement will be linked and presented as a single instance of a contact with the agent. In other words, when a stored recording of the video and/or audio associated with this customer is replayed 1065, the stored version 1045 can begin with the CCTV, then the Video and Audio Recording, then finishing with the CCTV in seamless fashion. This ability to link communication across different video cameras and indeed video channels 1020, 1030) allows various levels of branch or local analytics to take place, focused around how people interact and utilise the branch environment. A "stitched" camera perspective, therefore, is used to build a video journal of the customer's interaction with the business. The customer's interaction and data record (1000) stored (1045) in an archival call records database (1005) is not restricted to just internal CCTV cameras. There may be others on the journey such as cameras in the ATM machine outside, mobile devices such as phones and tablets, body cams, video enabled glasses etc.

The video cameras (1040, 1050) that capture the customer and agent in a conversation may include be non-associated cameras in operation that are captured to assist with training. Without limiting the invention, and as an example only, a non-associated camera may be any recording device that is not directly involved in the enablement of the communication between the parties such as an agent and the customer. The non-associated camera, or any cameras discussed herein may be video and audio enabled or have only one of the two. For example a separate camera may be positioned to look at the agent to enable the analytics of how agents work when engaged in a customer interaction, such as body language etc. and this may require multiple perspectives of the agent and also provide visibility of off screen activities that potentially distract the agent.

In this regard, a recording system includes at least one agent computer configured to accommodate bi-directional communications over a network between the at least one agent computer and a remote computer, the at least one agent computer connected to a processor and memory configured with an archiving selection module. A first recording apparatus is in data communication over the network with the at least one agent computer, the first recording apparatus configured to implement instructions received from the archiving selection module to (i) selectively gather screen captures of the at least one agent computer during the bi-directional communications and store the screen captures with a respective time stamp; (ii) selectively gather video data generated at the at least one agent computer and store the video data with a video time stamp; and (iii) selectively gather audio data generated at the at least one agent computer and store the audio data with an audio time stamp. In another embodiment, the system may gather text data for situations such as agent-customer interactions via text chat. The archiving selection module comprises computer implemented commands stored therein to effect the selective gathering according to a randomizing rule, a line of business rule, or by locating a third party tag within the bi-directional communications. Data may further be gathered from data on the device or through integration with other applications. The system may optionally include an archival system connected to the network for storing the screen captures, the video data, and the audio data after assembling a consolidated communication according to the time stamps as adjusted for drift errors. In one embodiment, the first recording apparatus is positioned in a first private branch exchange local to the at least one agent computer, the system further comprising a second recorder in data communication with a customer computer in a second private branch exchange, the second recorder selectively gathering remote audio, remote video, and remote screen captures from the customer computer according to corresponding instructions from the archiving selection module. The archiving selection module is stored in a data center between the at least one agent computer and the customer computer. At least one agent computer is in communication with a load balancer comprising computer memory and a processor configured to parse the bi-directional communications into screen data, video data and audio data according to identification protocols accessible to the processor.

To ensure proper allocation of resources, the first recorder includes a respective portion of memory in the first recorder for audio data, video data, and screen capture data. In another embodiment, the system may utilize respective recorders for audio data, video data, and screen capture data. An archival system is connected to the network for storing the screen captures, the video data, and the audio data after assembling a consolidated communication according to the time stamps in the data, as adjusted for drift errors. An archival system comprises a consolidation module to pair audio data and screen capture data and store video data separately. A system according to embodiments herein operate according to rules based commands for down sampling for long term storage an incoming data stream according to content of audio data, video data, and screen capture data.

In order to allow increasing levels of Quality Assessment and Compliance, that the following information will be derived from the video streams in both real-time and post process analytics as part of the recording system:

Eye Contact between the parties involved in the video interaction.

Stress levels detected from visual cues in the interaction.

Branding and position within the video interaction, is the corporate branding conforming to standards and regulation.

Signals and signage use parties involved in the video interaction, examples might be providing addition information to influence a sale by showing someone on paper.

Gender detection

Emotion detection.

Obscured face detection.

Face detection, both of the customer and the agent, the agent will be particularly important for remote agents to confirm the correct person is on the video link.

In addition to face recognition other forms of authentication may be used including deep vain, and retina scanning.

People counting, number of people involved in the interaction, ensure people are not walking by the agent in the background for example.

Minor detection if there are minors in the call that should not be in a video call, this will trigger the stopping of video recording.

Health condition cues such as excessive coughing may flag up to health care providers and influence the assistance they provide, another example my by pigmentation of the skin to detect medical conditions.

GPS and location information, i.e. GPS location information of the camera, but also location information such as angle and orientation of the camera.

Flesh detection, agents and customers may requirement protection from other parties on the call and detection of flesh and body parts may form part of this protection and proactive alerting.

Video energy, the speed of change in the video screen may be measured and used to drive a pictorial representation of the video portion of the call, this activity displayed at replay time would enable the replayer to jump to the area of high video.

These analytics events will be combined with other data from the audio stream along with $3^{rd}$ party meta data to drive analyses. These analysis events, in turn, may drive email alerts, screen pops at the agent, supervisor or fraud advisors, desktop or mobile devices, or updates to $3^{rd}$ party applications. They may equally drive predictive analytics which in real-time will influence the scripts used in the call or any further routing that takes place within the call centre. Thus, video events will also be used to help contribute the quality assurance aspects of an agent/customer call where agents are automatically scored for engagement via virtual eye detection, brand representation, emotional responsiveness, etc.

The recording apparatuses and associated systems described herein account for passive versus active authentication. For example, software may be implemented using audio only to passively identify call participant without the participant even noticing or taking any particular step in the process. In active identification processes, the participant takes an affirmative step such as peering into a camera for eye detection. Assign active ID steps for legally required contexts such as detecting the age or status as a minor in a transaction.

At least one video camera is potentially always on in these embodiments, such that the potential for pre-video call analytics and actions are prevalent. For example, the recorder on seeing a person enter the kiosk could determine a high likelihood of their identity and allow the agent to great them immediately on connection. Alternatively it could route them to their preferred agent or one they have previously interacted with to provide that branch experience even in the kiosk. It might detect that they have a bike helmet on and ask them to remove this prior to connection. This system would likely use motion detection to identify someone in front of the camera at which point the recorder will invoke its pre-call video analytics and potentially influence the environment conditions at the camera by playing audio etc. The system may routing influence or indeed routing to a designated agent. Also the pre-identification of the customer at the kiosk could be used to influence delivery of adverts or other material to them while they are waiting for connection to the agent.

In certain embodiments, a pause/resume algorithm may apply to the video and/or audio recording to ensure that the system complies with payment card interfaces. These protocols allow for automatic stops during certain kinds of data recording, such as a credit card security "CV2" number collection. The system is configured via computer implemented software to recognize the collection of this data via word analysis or other techniques to pause recording for privacy issues. Upon completion of the data collection in real time by an agent, the recording system may implement a command to begin, or resume, recording again. Equally important other business requirements may require the selective pausing of the audio and not the video or any combination thereof. All recording operations discussed herein may account for features that are used during an interaction in a live multimedia interaction as shown in FIG. 9. For example, the recording algorithms account for DPA Pause Events on desktop→Recording System Receives→ pauses the Audio and Video Recording which may be on one or more recorders. DPA Resume Event on desktop→Recording system receives→resumes the audio and video recording which may be on one or more recorders. With these kinds of interruptions or changes in the data collection, the systems herein account for the changes in the matching of different channels constituting a single multimedia interaction.

When dealing with kiosks it may be possible to provide further validation of the identity of the individual using contactless pay technologies as these would be used to confirm the identity of the person in the kiosk and subsequently use this to cross check with a face on record, or in some scenarios drive enrolment. This system is implemented with multiple facets of biometric data that can be correlated—such as tagging, time stamps, metadata; consider other correlation points such as location data as a fraud check tool. Furthermore additional gateway side recording of video, audio, screen data may be implemented. When considering issues such as the Billing ANI, the Real ANI, the presentation ANI, and the various proxy algorithms in Video over IP recording there remains a question of which location is the best for tapping with recording hardware to implement algorithms such as metadata and audio.

In this regard, a system of FIG. 10 may include a monitoring server 1000 comprising a processor and a memory coupled to the processor, the memory storing a set of trigger condition data 1010. A remote agent workstation 1071, 1078 comprising respective applications operating thereon is in data communication with the monitoring server 1000 over a network, wherein the monitoring server and the remote agent workstation are configured with respective computer implemented instructions to perform a method comprising the steps of (i) receiving, at the monitoring server and via the network, multimedia updates 1015 from the remote agent workstation, the multimedia updates 1015 corresponding to changes in workstation data processed by at least one of the applications on the remote agent workstation; (ii) identifying, at the monitoring server, the presence 1025 of a trigger condition from the multimedia updates, and upon identifying by the monitoring server that the trigger condition exists; (iii) controlling, with the monitoring server, data recording of audio data and on-screen data associated with the remote agent workstation; (iv) capturing, during the data recording, video imagery from the remote agent workstation; and (v) storing 1035 the audio data, on-screen data, and video imagery in a call records database. The trigger condition data includes facial recognition data for an agent at the remote agent workstation and the trigger condition comprises an agent identification. The trigger condition data comprises a voice signature for an agent at the remote agent workstation, and the system further comprising comparing the voice signature to the audio data for an agent identification. A system according to this embodiment analyzes the audio data or the video imagery for gender detection, race detection, physical body attributes, voice volume detection, voice frequency patterns, facial obscurities, health symptoms, skin aberrations, and exposed flesh conditions in regard to the agent. Another embodiment is triggered by detecting a document or a document content.

In one embodiment, a customer camera is also connected to a customer facing computer 1075 on the network such that a customer using the customer facing computer is within a customer camera field of view. A customer security camera, having a first geographical area within the customer security camera field of view is connected on the same network or across a link from a different network to direct multimedia data signal to a call records database 1005. An agent interaction camera is connected to the remote agent workstation and the network such that an agent using the remote agent workstation is within an agent interaction camera field of view.

An agent security camera is connected to the network and positioned to encompass an agent workspace and a second geographical area within the agent security camera field of view. The trigger condition data may include facial recognition data for a customer within the customer camera field of view or the customer security camera field of view and the trigger condition comprises a customer identification. The trigger condition data may also comprise a voice signature for a customer at the customer facing camera, and in this non-limiting embodiment, the system further comprises comparing the voice signature to customer audio data for a customer identification. The processing systems disclosed herein include software modules for analyzing customer audio data or customer video imagery for gender detection, race detection, voice accent detection, physical body attributes, voice volume detection, voice frequency patterns, facial obscurities, health symptoms, skin aberrations, and exposed flesh conditions in regard to the agent.

In one non-limiting embodiment, the customer camera and the customer security camera forward respective versions of both customer audio data and customer video data to a first private branch exchange in communication with the network, and the agent security camera and the agent interaction camera forward additional versions of both agent audio data and agent video data to a second private branch exchange in communication with the network. An archival recording apparatus (1055) is connected to the network, wherein each of the first and second private branch exchanges comprises local session border controllers and local load balancers that direct duplicate versions of the customer audio data, customer video data, agent interaction audio data, agent interaction video data, agent security audio data, and agent security video data to the archival recording apparatus.

The archival recording apparatus 1055 uses the recombine and replay functions 1065 so that the apparatus may be positioned in a data center connected to the network, and the data center comprises at least one analytics server configured to access the duplicate versions in the archival recording apparatus. The analytics server uses comprises at least one application that stitches portions of the duplicate versions of the customer audio data, customer video data, agent interaction audio data, agent interaction video data, agent security audio data, and agent security video data into a compilation version of a customer transaction. The analytics server identifies triggers from the duplicate versions, wherein the triggers direct computer implemented instructions from the analytics server to a customer facing computer and an agent facing computer connected to the network. The analytics server identifies a trigger in the form of either private video or private audio content and pauses recording. The instructions programmed in the analytics server, a load balancer, or a session border controller may include directives to off load processing functions to a graphics processor.

The embodiments of data recording systems and even real time analytics programs allow for development of a system for scoring an agent interacting with customers by electronic means. In one embodiment, a scoring module connected to a network processor may include an analytics server having a processor and a memory coupled to the processor, a remote agent workstation comprising respective applications operating thereon and in data communication with the analytics server over a network, a customer camera connected to a customer facing computer on the network such that a customer using the customer facing computer is within a customer camera field of view, an agent interaction camera connected to the remote agent workstation and the network such that an agent using the remote agent workstation is within an agent interaction camera field of view, wherein the analytics server, the remote agent workstation, and the customer facing computer are configured with respective memory storing computer implemented instructions to perform a method comprising the steps of:

(i) authenticating the agent at the remote agent workstation;

(ii) scoring the agent according to score parameters stored in the memory of the analytics server by comparing the score parameters to customer audio data, customer video data, agent interaction audio data, and agent interaction video data.

As discussed herein, the analytics server is configured to:
selectively gather screen captures of the at least one agent computer during the bi-directional communications and, in real time, parse a portion of the screen capture for analysis;
selectively gather video data generated at the at least one agent computer and, in real time, parse a portion of the video data for analysis;
selectively gather audio data generated at the at least one agent computer and in real time, parse a portion of the audio data for analysis. These features of the system allow the system to authenticate the agent by one or more of real time speech analytics performed on the portion of the audio data and biometric data gathered from the portion of the video data. Furthermore, the analytics server compares the score parameters to at least one of the portions of the agent video data sufficient to evaluate virtual eye contact between the agent and the customer.

In other embodiments, the system may incorporate a customer security camera connected to the network and having a first geographical area within the customer security camera field of view and an agent security camera connected to the network and positioned to encompass an agent workspace and a second geographical area within the agent security camera field of view, wherein the system is configured to:
(i) selectively gather screen captures of either the agent computer or the customer computer during the bi-directional communications and, in real time, parse a portion of the screen capture for analysis;
(i) selectively gather video data generated at the at least one agent computer or the customer computer and, in real time, parse a portion of the video data for analysis;
(iii) selectively gather audio data generated at either the agent computer or the customer computer and in real time, parse a portion of the audio data for analysis.

In order to ease the enrolment of both audio and faces in the biometrics and identity systems, if the person is already registered one characteristic then it can be used to speed the enrolment of the other. For example if I have a positive match of the voice biometric, then the face can be enrolled based on the contact and the successful voice authentication. Similarly the reverse is also true if the face matches that of the enrolled individual then the interaction can be used to enroll the person's voice. Use the enrollment data to check and see if real time data matches the historical data for this ID. If not, then define next actions. View the video recording allow document extraction, using character recognition type capabilities, all on the same camera, for example the customer maybe able to provide proof of ID via this mechanism holding up their passport and drivers licenses etc.

Where the system knows information such as the customers social media identity it can use this information to cross check their face and even potentially enroll the customer from their picture in the social space. Indeed many social media applications do provide face API's and it may be that the recording system interfaces to this to provide assistance or services in the identification of individuals. Similar face comparison might exist from Instagram or linkedin profile pictures, the system with enroll, calibrate and refine its face recognition capability based on multiple sources, and will also use this to mitigate issues from the passage of time, for example the system may learn that the person has indeed grown a beard from their social pictures. The system may equally use social presence information to confirm location information, if for example it receives calls from someone abroad and yet can determine from their posted location information that they are not abroad this might help identify fraud. One may then consider a layered approach to verifying the image with intelligence tracking along and along that gradually grows into accuracy based on the social media source along with above discussed time stamp, meta data, video, audio, screen data quality, reproduction potential and the like.

The video medium may also be used to deliver announcements to the customer that has traditionally been delivered via audio; examples would include beeps if the call is being recorded. In this disclosure the recording system would invoke the display of the message to one or more parties on the video call that the call is being recorded.

Equally the system may simply present to the agent the picture of the customer on record, so that the agent can make their own determine if this is the correct person on the video link.

Equally the information about the customer involved in the call and other derived analytics such as emotion might be used to drive targeted video marketing material either during the agent conversation or just after.

Equally the information from the video stream may be used to drive detailed survey information after the call has ended by before the customer has left the conversation.

In real-time and post call recording within the recording system the system will have the ability to combine derived data events form the video stream such as face identity, emotion, eye-contact, disguise, with event form the audio stream such as voice biometrics, spoken words, language identification, this intern via the use of rules can be used to drive actions such as email, screen popups, $3^{rd}$ party system notifications. In addition the recording system will be able to take other meta-data captured by the system and apply this to the rules in order to further drive the actions. This ability to combine these events form different contact streams within the environment in both real and post process will be unique. The system may further use biometric and metadata event from external elements to drive elements such as enrolment.

For example:
Recording System Validates the face→Recording System Validates the voice→Recording system receives account information from a validated smart/automated touch or wireless transaction→Recording system delivers a low risk score event to the agent via desktop popup.
Recording System receiving the Account ID→Recording System Validates the voice→Recording system determines that there is no face on record→Recording system enrolls the capture face in the system.

These events may arrive in any order and may result in one or more actions per call.

The systems described above include taking more samples of the voice, storing updated versions of the voice prints and iteratively learn which voice print is the best one to save that captures all the nuances in prior saved versions so that the voice print can be used for ID purposes without having to search a larger history of voice prints. Post processing issues might include real time data acquisition used to flag and pre-select certain video/audio/screen selection and then retroactive batch processing. For example, identify repeated calls and voices/images/data related to a call. Cross Channel Diagnostic algorithms allows for multi-media capture (email, chat, social media, audio, video, screen data, incorporating tags and analytic results into meta data that can be useful to hardware used in various systems (e.g., sending customers to the same agent as last time the customer called in or came to kiosk).

Security measures for archival systems may include encryption techniques at any point of the processes.

As used herein, all of the systems of this disclosure are amenable to the incorporation of automatic steps, such as automatic face, text, or voice recognition. The logic of the modules enacted herein is equipped to do multiple recordings simultaneously and use meta data logic and algorithms to associate the screen, video and audio together with the use of additional meta data streams, for example the audio and video will be associated by the ip addresses potentially of the data streams, whereas the screen capture might be associated by the logged-on user at the computer and associating this to the extension/agent id. The systems herein incorporate the use of applying additional meta data content to the recorded media streams to add context, increase the correlation and allow the application of advanced business rule logic in routing, applications and storage of said media streams. For example only recording specific video endpoints, only allowing application access based on identity information associated with the media streams, only archiving content from specific streams based on associated identity of line of business information for example, Generally there would be logic to associate and control the association of situational camera's along with the video interaction recordings of audio, video and screen we should ensure the use of this control server and any associated meta data that might be received from other sources is also covered. For example you might go into a mortgage meeting in a room, the conversation would be recorded on the agents PC/Phone and then the video associated from the security camera covering the room.

The designs of this disclosure ensure the association of one or more security cameras is covered for example as the customer makes their way to the eventual agent meeting and leave it, and this associate logic might be achieved by identifying piece of security footage with the matching face in it for example or other associated metadata. Instead of storing the imagery in the call records database, the system may be configured to store files on disk storage, the database usually has metadata that is used to find the content in the file storage. Media content even within the same call may be stored in different locations, i.e. audio, screen and video could all have different location and retention periods.

Generally, all embodiments described herein include mobile devices such as phones and tablets, from audio, screen, video, geolocation and metadata perspective. And any mix thereof, i.e. customer on a smart phone, and agent on a PC etc.

Associated to the quality monitoring we need a claim for a recording system with the ability to provide a real-time live feed to a monitoring supervisor of the video, audio and screen content on a agent, this basically provides the equivalent live monitor functionality we have today with the added complexity of delivering the video on in real-time with association to the audio and screen streams which may be coming from different recording/capture locations. These embodiments further ensure that real-time use of analytics i.e. identifying someone face straight away during the call and is able to provide alerts, impaction application logic or routing of the call. Of course, the embodiments described herein incorporate post interaction analytics allowing a user to review content by going back over calls looking for newly identified elements that maybe of interest i.e. a newly discovered person of interest.

Another element that is particularly useful in the methods, systems and apparatus of this disclosure is multi-factor identification, where at least one element from multiple data streams is used in real time or post process to verify or identify attributes of the people involved in the calls, for example the voice of the customer from the audio, the face of the customer from the video, will both be used to identify a customer and these two identities will be compared together to ensure they match, providing true multi-factor authentication.

Figure 11:
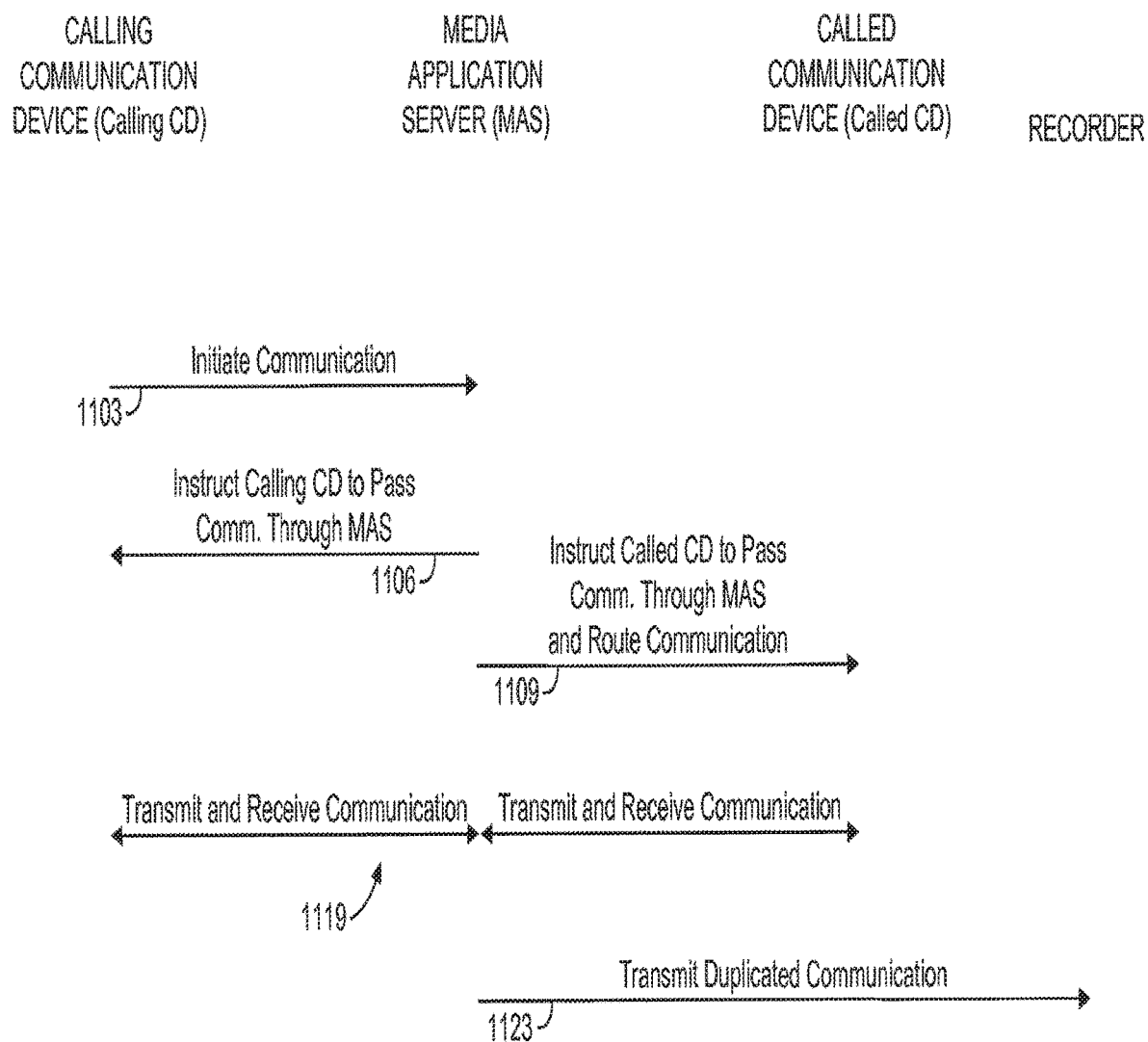
FIG. 11 is a sequence diagram of an embodiment of a system in which a media communication can be recorded via a media application server.

FIGS. 10 and 11 illustrate example processes for proper archival purposes in regard to multimedia data interactions and communications. As discussed above, the monitoring server (1000) may include software to identify multimedia data triggers that correspond to protocols initiated for preparation in regard to archival and storage operations.

One operation that may be useful in the logic of control software for operation of storage and archival includes determination of tapping locations, discussed above. Factors that may come into account in determining a proper tap location for a particular kind of data (identified pursuant to multimedia data tags) may be tabulated as follows without limiting this disclosure to any one set-up or logical algorithm:

TABLE 1

TAPPING LOCATIONS AND OPTIMIZING TAP SELECTION CRITERIA

|  | TAP - Network Trunk ($TAP_{NT}$) | TAP - Gateway ($TAP_{GW}$) | TAP - Session Border Controller ($TAP_{SBC}$) | TAP - Switch Port Analyzer ($TAP_{SPAN}$) | TAP - Automatic Call Distribution ($TAP_{ACD}$) | TAP - IP Analyzer ($TAP_{IPA}$) |
|---|---|---|---|---|---|---|
| Direct Stream Recording | Yes | Yes | Yes | Yes | Yes | Yes |
| Forking + Recording | No | Yes | Yes | No | Yes | Yes |
| Duplication + Recording | No | No | Yes | Yes | No | No |
| Decoding/ Reconstruction + Recording | No | Yes | Yes | No | No | No |
| Filtering + Recording | No | Yes | Yes | Yes | Yes | Yes |
| Selective Frame Recording | No | Yes | Yes | No | No | Yes |
| Signaling Data Analysis + Recording | No | Yes | Yes | No | No | No |
| Meta Data Analysis + Recording | No | No | No | Yes | No | Yes |
| Control Plane Analysis + Recording | No | Yes | Yes | Yes | No | Yes |
| Data Plane Analysis + Recording | No | No | No | No | No | Yes |

TABLE 1-continued

TAPPING LOCATIONS AND OPTIMIZING TAP SELECTION CRITERIA

| | TAP - Network Trunk (TAP$_{NT}$) | TAP - Gateway (TAP$_{GW}$) | TAP - Session Border Controller (TAP$_{SBC}$) | TAP - Switch Port Analyzer (TAP$_{SPAN}$) | TAP - Automatic Call Distribution (TAP$_{ACD}$) | TAP - IP Analyzer (TAP$_{IPA}$) |
|---|---|---|---|---|---|---|
| XML Data Anlaysis + Recording | No | No | No | Yes | No | Yes |
| Incoming Data Only | Yes | No | No | No | No | No |
| Back to Back Video Proxy | No | No | No | Yes | No | No |
| Audio & Video Syncing | No | No | No | Yes | No | Yes |
| Data Frame Tagging | No | Yes | Yes | No | No | No |
| Time Stamp Insertion | No | Yes | Yes | Yes | No | No |

At least one additional embodiment that may be gained via the discussion above is set forth schematically in FIG. 11 and includes a system wherein the session border controller is configured as an SIP proxy for incoming data (1103). Also a system for analyzing the incoming data in the form of multimedia data content over a network may include a customer camera connected to a customer facing computer (i.e., a calling communication device) on the network such that a customer using the customer facing computer is within a customer camera field of view; an agent interaction camera connected to an agent facing computer (i.e., a called communication device) on the network such that an agent using the agent facing computer is within an agent interaction camera field of view; an agent security camera connected to the network and positioned to encompass an agent workspace within the agent security camera field of view; an archival recording apparatus such as a media application server is connected to the network and comprising a recording processor and recording memory configured to receive respective incoming data streams (1106, 1109) of multimedia data from the customer camera, the agent interaction camera, and the agent security camera, wherein the recording apparatus stores an archive compilation of at least portions of the respective incoming data streams. The same system may further include a customer security camera having a first geographical area within the customer security camera field of view. The customer camera and the customer security camera forward or transmit (1119) respective versions (1106, 1109) of both customer audio data and customer video data to a first private branch exchange in communication with the network, and the agent security camera and the agent interaction camera forward additional versions of both agent audio data and agent video data to a second private branch exchange in communication with the network. Each of the first and second private branch exchanges comprises local session border controllers and local load balancers that direct (1119) duplicate versions (1123) of the customer audio data, customer video data, agent interaction audio data, agent interaction video data, agent security audio data, and agent security video data to the archival recording apparatus. The archival recording apparatus is positioned in a data center connected to the network and the data center comprises at least one analytics server configured to access the duplicate versions in the archival recording apparatus. An analytics server may be configured to utilize at least one application that stitches portions of the duplicate versions into a compilation version of a customer transaction.

The invention claimed is:

1. A system of storing communications data in a contact center telephony environment, the system comprising:
a customer camera connected to a customer facing computer located at a customer kiosk connected to a conference bridge within the contact center telephony environment such that a customer using the customer facing computer is within a customer camera field of view;
a customer security camera having a first geographical area within a customer security camera field of view and positioned for recording customer interactions within the first geographical area and for recording customer on-screen data on the customer facing computer;
an agent interaction camera connected to a remote agent workstation and the conference bridge such that an agent using the remote agent workstation is within an agent interaction camera field of view;
a monitoring server comprising a processor and a memory coupled to the processor, the memory storing computer executable instructions that access a set of triggers that are stored on the monitoring server and that direct additional computer executable instructions to the remote agent workstation;
the remote agent workstation comprising respective applications operating thereon and in data communication with the monitoring server over the conference bridge, wherein the monitoring server and the remote agent workstation are configured with respective computer executable instructions to perform a method comprising the steps of:
receiving, at the monitoring server and via the conference bridge, multimedia updates from the remote agent workstation during a given multimedia communications session with the customer facing computer at the customer kiosk, the multimedia updates consisting of changes in remote agent workstation data processed by at least one of the respective applications on the remote agent workstation;
identifying, at the monitoring server, a trigger stored on the monitoring server within trigger condition data from the multimedia updates during the given multimedia communications session and upon identifying that the trigger on the monitoring server is present in the trigger condition data, then:
controlling, with the monitoring server, data recording of agent audio data and agent video imagery from the remote agent workstation; and
storing the customer on-screen data, the agent audio data and the agent video imagery in a call records database, wherein the controlling and the storing occur during the given multimedia communications session.

2. The system according to claim 1, wherein the trigger condition data comprise facial recognition data for an agent at the remote agent workstation and the trigger condition comprises an agent identification.

3. The system according to claim 1, wherein the trigger condition data comprises a voice signature for the agent at the remote agent workstation, and the system further comprising comparing the voice signature to the agent audio data for an agent identification.

4. The system according to claim 1, wherein the trigger condition data comprises facial recognition data for the customer within the customer camera field of view or the customer security camera field of view and the trigger comprises a customer identification.

5. The system according to claim 1, wherein the trigger condition data comprises a voice signature for the customer at the customer facing computer, and the system further comprises comparing the voice signature to customer audio data for a customer identification.

6. The system according to claim 1, further comprising analyzing customer audio data or customer video imagery from the customer facing computer for gender detection, race detection, voice accent detection, physical body attributes, voice volume detection, voice frequency patterns, facial obscurities, health symptoms, skin aberrations, and exposed flesh conditions in regard to the customer.

7. The system according to claim 1, wherein the customer camera and the customer security camera forward respective versions of both customer audio data and customer video data to a first private branch exchange in communication with the conference bridge.

8. The system according to claim 7, further comprising:
a local session border controller and a local load balancer connected to the first private branch exchange; and
an archival recording apparatus connected to the first private branch exchange, wherein the local session border controller or the local load balancer directs duplicate versions of the customer audio data, the customer video data, and the customer on-screen data to the archival recording apparatus.

9. The system according to claim 1, further comprising an agent security camera connected to the conference bridge and positioned for recording agent interactions within an agent workspace and a second geographical area and for recording agent on-screen data on the remote agent workstation.

10. The system according to claim 9, wherein the agent security camera forwards the agent on-screen data to a second private branch exchange in communication with the conference bridge.

11. The system according to claim 10, further comprising an archival recording apparatus connected to the conference bridge, wherein the second private branch exchange comprises a local session border controller and a local load balancer that direct duplicate versions of the agent audio data, the agent video imagery, and the agent on-screen data to the archival recording apparatus.

12. A system of storing communications data in a contact center telephony environment, the system comprising:
a customer camera connected to a customer facing computer connected to a conference bridge within the contact center telephony environment such that a customer using the customer facing computer is within a customer camera field of view;
a customer security camera having a first geographical area within a customer security camera field of view and positioned for recording customer interactions within the first geographical area and for recording customer on-screen data on the customer facing computer;
an agent interaction camera connected to a remote agent workstation and the conference bridge such that an agent using the remote agent workstation is within an agent interaction camera field of view;
an agent security camera connected to a network and positioned to encompass an agent workspace and a second geographical area within the agent security camera field of view;
an archival recording apparatus connected to the conference bridge;
a monitoring server comprising a processor and a memory coupled to the processor, the memory storing computer executable instructions that access a set of triggers that are stored on the monitoring server and that direct additional computer executable instructions to the remote agent workstation,
wherein the remote agent workstation comprises respective applications operating thereon and in data communication with the monitoring server, wherein the monitoring server and the remote agent workstation are configured with respective computer executable instructions to perform a method comprising the steps of:
receiving, at the monitoring server and via the conference bridge, multimedia updates from the remote agent workstation during a given multimedia communication session with the customer facing computer, the multimedia updates comprising changes in remote workstation data processed by at least one of the respective applications on the remote agent workstation;
identifying, at the monitoring server, a trigger stored on the monitoring server within trigger condition data from the multimedia updates during the given multimedia communications session and upon identifying that the trigger on the monitoring server is present in the trigger condition data, then:
controlling, with the monitoring server, data recording of agent audio data and agent video imagery from the remote agent workstation; and
storing the customer on-screen data, the agent audio data and the agent video imagery into the archival recording apparatus, wherein the controlling and the storing occur during the given multimedia communications session; and
an analytics server comprising at least one application configured to produce a data compilation of a customer transaction,
wherein the analytics server comprises at least one application that stitches portions of the customer on-screen data, the agent audio data, and the agent video imagery into the data compilation of the customer transaction.

13. The system according to claim 12, wherein the monitoring server identifies a trigger in the form of either private video content or private audio content and pauses recording.

14. The system according to claim 12, wherein the computer executable instructions include directives to off load processing functions to a graphics processor accessible to the monitoring server.

15. The system according to claim 12, wherein the analytics server directs the system to route an identified customer to a selected agent.

16. The system according to claim 12, wherein the archival recording apparatus is located in a local load balancer connected to the monitoring server and the analytics server.

17. The system according to claim 12, wherein the archival recording apparatus is located in a local border session controller connected to the monitoring server and the analytics server.

18. The system according to claim 12, wherein the data compilation of the customer transaction that is stitched together by the analytics server further comprises customer audio data and customer video data from the customer camera.

19. The system according to claim 18, wherein the data compilation of the customer transaction that is stitched together by the analytics server further comprises agent on-screen data from the agent security camera.

\* \* \* \* \*